United States Patent [19]

Kaku et al.

[11] Patent Number: 5,757,865
[45] Date of Patent: May 26, 1998

[54] CARRIER PHASE CONTROL CIRCUIT

[75] Inventors: Takashi Kaku; Noboru Kawada; Hideo Miyazawa, all of Kawasaki, Japan

[73] Assignee: Fujitsu Limited, Kawasaki, Japan

[21] Appl. No.: 553,990

[22] Filed: Nov. 6, 1995

[30] Foreign Application Priority Data

Dec. 20, 1994 [JP] Japan ................................. 6-317332

[51] Int. Cl.⁶ ............................................. H04L 27/06
[52] U.S. Cl. ............................................. 375/344; 375/232
[58] Field of Search ........................ 375/344, 230, 375/232, 229; 455/257; 333/18; 329/318

[56] References Cited

U.S. PATENT DOCUMENTS

| | | | |
|---|---|---|---|
| 4,777,640 | 10/1988 | Turner et al. | |
| 4,926,499 | 5/1990 | Kobayashi et al. | 375/371 |
| 5,077,755 | 12/1991 | Kaku et al. | 375/232 |
| 5,189,684 | 2/1993 | Kaku et al. | 375/232 |
| 5,255,290 | 10/1993 | Anvari | |
| 5,412,695 | 5/1995 | Murata | 375/344 |
| 5,440,589 | 8/1995 | Kaku et al. | 375/344 |
| 5,598,434 | 1/1997 | Kaku et al. | 375/230 |

FOREIGN PATENT DOCUMENTS

| | | |
|---|---|---|
| 0 433 458 A1 | 6/1991 | European Pat. Off. . |
| 0 536 687 A2 | 4/1993 | European Pat. Off. . |
| 0 601 855 A2 | 6/1994 | European Pat. Off. . |
| 2 275 394 | 8/1994 | United Kingdom . |

*Primary Examiner*—Temesghen Ghebretinsae
*Attorney, Agent, or Firm*—Nikaido, Marmelstein, Murray & Oram LLP

[57] ABSTRACT

The invention provides a carrier phase control circuit which can eliminate a phase intercept fluctuation so that, when the carrier phase control circuit is applied to a very high speed modem having a communication speed of, for example, 28.8 kbps, occurrence of a communication error can be suppressed and the modem has an improved characteristic. The carrier phase control circuit is provided on a reception side of a communication apparatus and interposed between an automatic equalizer and a signal decision section. The carrier phase control circuit includes a frequency offset removal section for predicting and removing an offset of a frequency of a transmission signal based on an output of the automatic equalizer, and a phase intercept variation removal section for predicting and removing a phase intercept variation of the transmission signal based on an output of the frequency offset removal section and inputting a resulted signal as an output thereof to the signal decision section.

15 Claims, 13 Drawing Sheets

F I G. 11
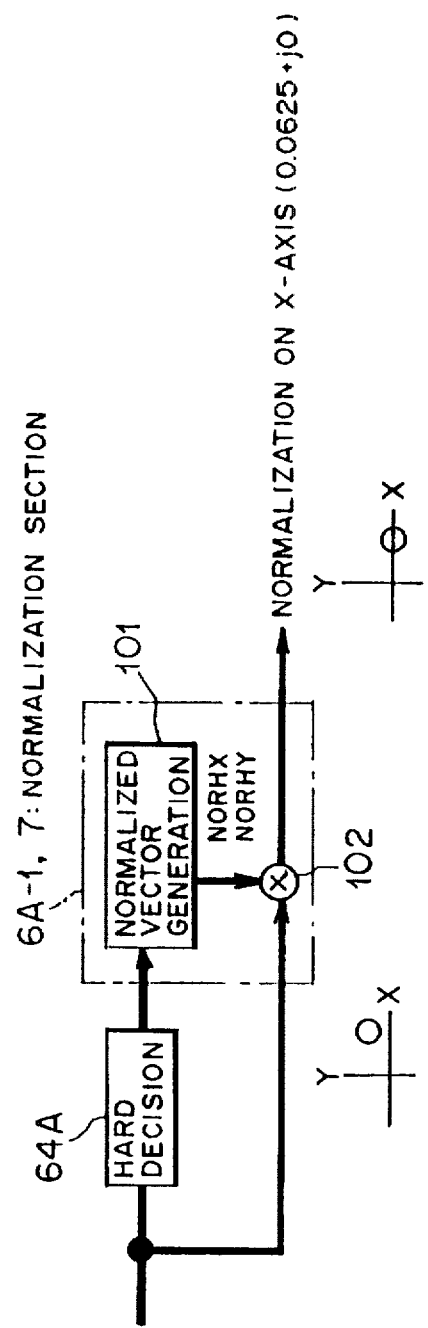

F I G. 14
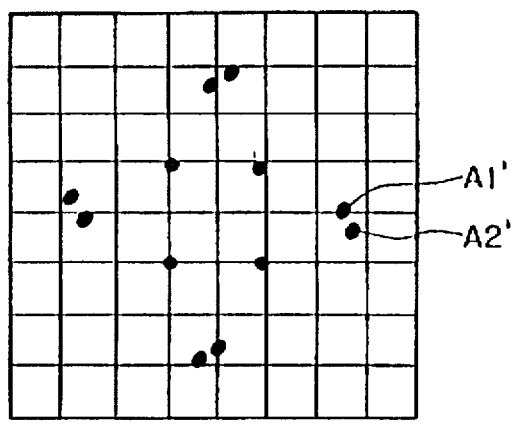
F I G. 15
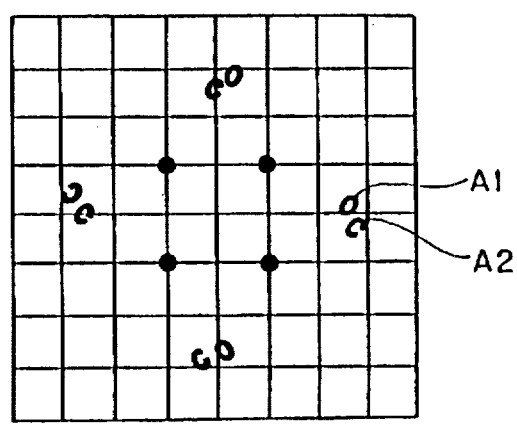

CARRIER PHASE CONTROL CIRCUIT

BACKGROUND OF THE INVENTION

1. Field of the Invention

This invention relates to a carrier phase control circuit for use with a reception section of a communication apparatus such as a modem which is used to communicate data using a telephone line or a private line.

2. Description of the Related Art

Various modems (modulator-demodulators) for use for transmission of data which can transmit data at various communication speeds have conventionally been provided.

Generally, modems for the communication speed of 9,600 bit/sec (9.6 kbps) according to the Recommendation V. 29 and modems for the communication speed of 14.4 kbps are practically used widely. However, in order to meet the request for a higher rate in communications in recent years, efforts are directed to development and investigation of very high speed modems for the communication speed of 28.8 kbps.

By the way, upon transmission of a transmission signal from a modem, signal points having a required eye pattern (data point arrangement pattern on a phase plane) are generated to modulate and transmit the data, and on the reception side, the received signal is demodulated to reproduce the data.

In a modem having such a very high communication speed of 28.8 kbps as described above, since the number of signal points on an eye pattern is much more than that of ordinary modems whose communication speed is 9.6 kbps or 14.4 kbps, the modem is influenced much by a line deterioration factor such as a frequency offset or a phase intercept fluctuation.

Further, in ordinary 9.6 kbps and 14.4 kbps modems, a carrier phase control circuit performs forecasting control to remove a frequency offset. However, since a phase intercept fluctuation is such a small deterioration factor as can be ignored, there is no need of particularly performing control for removal of a phase intercept fluctuation.

Here, the phase intercept fluctuation signifies a deterioration factor which is superposed with a frequency of a frequency offset and multiples (for example, twice) of the frequency, and has an amplitude dependency and a phase dependency. More particularly, the phase intercept fluctuation signifies a phenomenon that a signal point moves on a small circular trajectory in the proximity of the signal point as indicated by a signal point A1 or A2 in FIG. 15.

However, with a model having a high communication speed of 28.8 kbps described above, since the distances between signal points decrease as the number of signal points increases, signal points are sometimes overlapped with each other such as, for example, the signal points A1 and A2 shown in FIG. 15, resulting in communication error.

In other words, a 28.8 kbps modem has a subject to be solved in that, since a phase intercept fluctuation of a signal point which does not matter with ordinary 9.6 kbps and 14.4 kbps modems has such a high influence as to cause a communication error, the deterioration of a phase intercept fluctuation must be cancelled.

SUMMARY OF THE INVENTION

It is an object of the present invention to provide a carrier phase control circuit which can eliminate a phase intercept fluctuation so that, when the carrier phase control circuit is applied to a very high speed modem having a very high communication speed of, for example, 28.8 kbps, occurrence of a communication error can be suppressed and the modem has an improved characteristic.

In order to attain the object described above, according to an aspect of the present invention, there is provided a carrier phase control circuit provided on a reception side of a communication apparatus and interposed between an automatic equalizer and a signal decision section, comprising a frequency offset removal section for predicting and removing an offset of a frequency of a transmission signal based on an output of the automatic equalizer, and a phase intercept variation removal section for predicting and removing a phase intercept variation of the transmission signal based on an output of the frequency offset removal section and inputting a resulted signal as an output thereof to the signal decision section.

With the carrier phase control circuit, since a phase intercept variation can be removed from a transmission signal, if the carrier phase control circuit is applied to such a very high speed modem that has a communication speed of, for example, 28.8 kbps, occurrence of a communication error can be suppressed. Consequently, the carrier phase control circuit is advantageous in that the characteristic of a very high speed modem can be improved remarkably, and this contributes very much to putting of the modem into practical use.

According to another aspect of the present invention, there is provided a carrier phase control circuit provided on a reception side of a communication apparatus and interposed between an automatic equalizer and a signal decision section, comprising a frequency offset removal section including a frequency offset prediction section for predicting an offset of a frequency of a transmission signal based on an output of the automatic equalizer and a multiplier for multiplying an output of the frequency offset prediction section and the output of the automatic equalizer, a signal decision error detection section for detecting a signal decision error from input and output information to and from the signal decision section, and a phase intercept variation removal section including a phase intercept variation prediction section for predicting a phase intercept variation of the transmission signal based on information of the signal decision error obtained by the signal decision error detection section and an output of the frequency offset prediction section of the frequency offset removal section, and an adder for adding an output of the phase intercept variation prediction section and an output of the multiplier and inputting a resulted signal to the signal decision section.

Also with the carrier phase control circuit, since a phase intercept variation can be removed from a transmission signal, if the carrier phase control circuit is applied to such a very high speed modem that has a communication speed of, for example, 28.8 kbps, occurrence of a communication error can be suppressed. Consequently, the carrier phase control circuit is advantageous in that the characteristic of a very high speed modem can be improved remarkably, and this contributes very much to putting of the modem into practical use.

According to a further aspect of the present invention, there is provided a carrier phase control circuit provided on a reception side of a communication apparatus and interposed between an automatic equalizer and a signal decision section which includes a hard decision section for outputting a false reference signal corresponding to an input signal thereto and a soft decision section for receiving the false reference signal and a hard decision input signal from the hard decision section to perform error correction, comprising a normalization section for normalizing the input signal to the hard decision section at a predetermined position on a vector plane based on the input signal to the hard decision section and the false reference signal from the hard decision section, a frequency offset removal section including a frequency offset prediction section for predicting an offset of a frequency of a transmission signal based on an output of the normalization section and a multiplier for multiplying an output of the frequency offset prediction section and an output of the automatic equalizer to remove the offset of the frequency of the transmission signal, a first signal decision error detection section for detecting a signal decision error normalized at a predetermined position on the vector plane from the input and output information to and from the hard decision section, a second signal decision error detection section for detecting a signal decision error normalized at a predetermined position on the vector plane from the input information to the hard decision section and output information from the soft decision section, a selector for selectively outputting information of the normalized signal decision error from the first signal decision error detection section or the second signal decision error detection section, a phase intercept variation removal section including a phase intercept variation prediction section for predicting a phase intercept variation of the transmission signal based on the normalized signal decision error information selectively outputted from the selector and an output of the frequency offset prediction section, and an adder for adding an output of the phase intercept variation prediction section and an output of the multiplier to remove the phase intercept variation from the transmission signal and inputting a resulted signal to the hard decision section, and a selector control section for controlling the selector to select, upon leading-in of a signal, the normalized signal decision error information from the first signal decision error detection section but select, in ordinary operation after such signal leading-in, the normalized signal decision error information from the second signal decision error detection section.

With the carrier phase control circuit, since the selector is controlled by the selector control section so that it selects, upon signal leading-in, normalized signal decision error information from the first signal decision error detection section but selects, in ordinary operation after such signal leading-in, normalized signal decision error information from the second signal decision error detection section, calculation for prediction of a phase intercept variation can be performed readily and removal of the phase intercept variation can be performed with a higher degree of accuracy similarly as described hereinabove. Besides, calculation for prediction of a phase intercept variation can be performed efficiently in response to a condition of a signal. Consequently, the carrier phase control circuit is advantageous also in that, if it is applied to such a very high speed modem that has a communication speed of, for example, 28.8 kbps, occurrence of a communication error can be suppressed efficiently with a high degree of accuracy by simplified calculation processing.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 11 is a block diagram showing a detailed construction of a normalization section of the carrier phase control circuit shown in FIG. 7;

FIG. 14 is a diagrammatic view showing an eye pattern after removal of a phase intercept variation; and FIG. 15 is a similar view but illustrating a phase intercept variation which makes a factor of signal deterioration.

DESCRIPTION OF THE PREFERRED EMBODIMENTS a. Aspects of the Invention

Aspects of the present invention will first be described with reference to the drawings.

Figure 1:
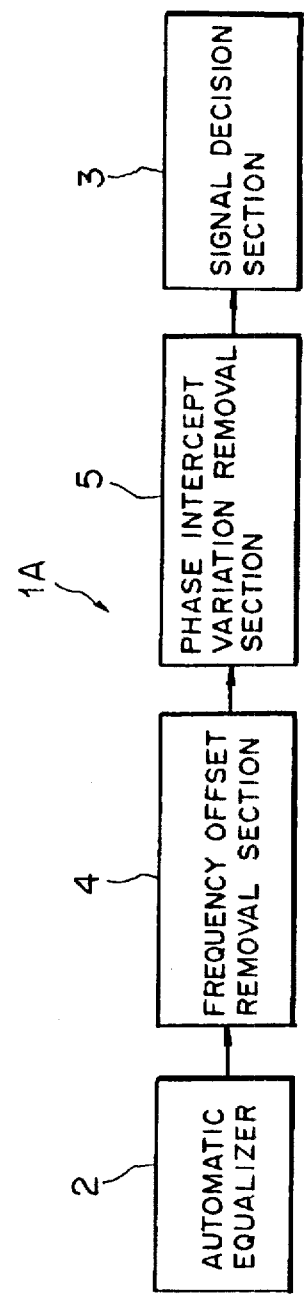
FIGS. 1 to 3 are block diagrams illustrating different aspects of the present invention.

Referring first to FIG. 1, there is shown in block diagram a carrier phase control circuit according to an aspect of the present invention. The carrier phase control circuit shown is generally denoted at 1A and is provided on a reception side of a communication apparatus and interposed between an automatic equalizer 2 and a signal decision section 3 of the communication apparatus. The carrier phase control circuit 1A includes a frequency offset removal section 4 and a phase intercept variation removal section 5.

The frequency offset removal section 4 predicts and removes an offset of the frequency of a transmission signal based on the output of the automatic equalizer 2. The phase intercept variation removal section 5 predicts and removes a phase intercept variation of the transmission signal based on the output of the frequency offset removal section 4 and inputs a resulted signal as an output thereof to the signal decision section 3.

In the carrier phase control circuit described above, as seen in FIG. 1, the frequency offset removal section 4 predicts and removes an offset of the frequency of a transmission signal based on the output of the automatic equalizer 2, and the phase intercept variation removal section 5 predicts and removes a phase intercept variation of the transmission signal based on the output of the frequency offset removal section 4 and inputs a resulted signal as an output thereof to the signal decision section 3. Consequently, a frequency offset and a phase intercept variation of a signal from the automatic equalizer 2 can be removed.

Accordingly, with the carrier phase control circuit described above, since a phase intercept variation can be removed from a transmission signal, if the carrier phase control circuit is applied to such a very high speed modem that has a communication speed of, for example, 28.8 kbps, occurrence of a communication error can be suppressed. Consequently, there is an advantage in that the characteristic of the very high speed modem can be improved remarkably, and this contributes very much to putting of the modem into practical use.

Figure 2:
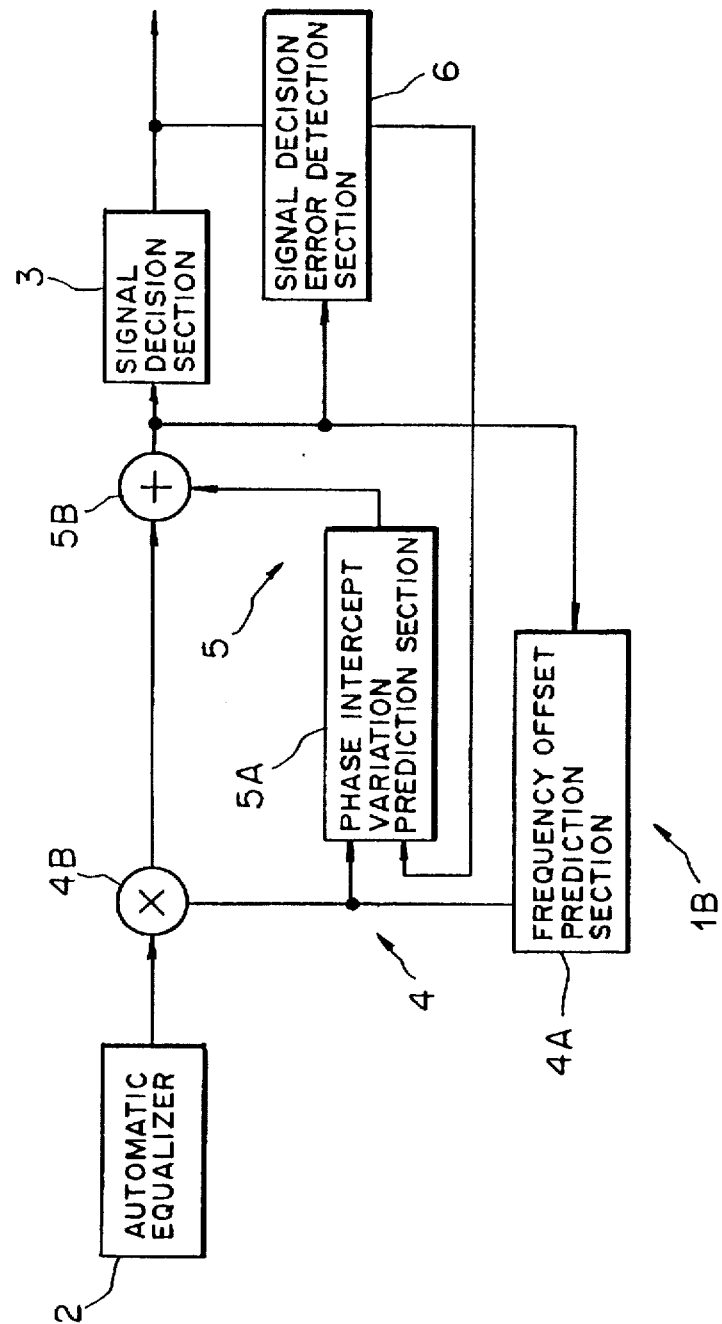

Referring now to FIG. 2, there is shown in block diagram a carrier phase control circuit according to another aspect of the present invention. The carrier phase control circuit shown is generally denoted at 1B and is provided on a reception side of a communication apparatus and interposed between an automatic equalizer 2 and a signal decision section 3 of the communication apparatus. The carrier phase control circuit 1B includes a frequency offset removal section 4, a phase intercept variation removal section 5 and a signal decision error detection section 6.

The frequency offset removal section 4 includes a frequency offset prediction section 4A for predicting an offset of the frequency of a transmission signal based on the output of the automatic equalizer 2 and a multiplier 4B for multiplying the output of the frequency offset prediction section 4A and the output of the automatic equalizer 2.

The phase intercept variation removal section 5 includes a phase intercept variation prediction section 5A for predicting a phase intercept variation of a transmission signal based on information of a signal decision error obtained by the signal decision error detection section 6 and the output of the frequency offset prediction section 4A of the frequency offset removal section 4, and an adder 5B for adding the output of the phase intercept variation prediction section 5A and the output of the multiplier 4B and inputting a resulted signal to the signal decision section 3.

The phase intercept variation prediction section 5A may include a correlation calculation section for calculating a correlation between signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A.

Or, the phase intercept variation prediction section 5A may include a first predictor for predicting a phase intercept variation of a transmission signal based on signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

In this instance, the first predictor may include a correlation calculation section for calculating a correlation between the signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A, and the second predictor may include a correlation calculation section for calculating a correlation between the signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A.

The signal decision section 3 may include a hard decision section for outputting a false reference signal corresponding to an input signal thereto, and the signal decision error detection section 6 may detect a signal decision error from input and output information to and from the hard decision section. In this instance, the phase intercept variation prediction section 5A may include a first predictor for predicting a phase intercept variation of a transmission signal based on signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

Alternatively, the signal decision section 3 may include a hard decision section for outputting a false reference signal corresponding to an input signal thereto, and a soft decision section for receiving the false reference signal and a hard decision input signal from the hard decision section to perform error correction, and the signal decision error detection section 6 may detect a signal decision error from input information to the hard decision section and output information of the soft decision section. In this instance, the phase intercept variation prediction section 5A may include a first predictor for predicting a phase intercept variation of the transmission signal based on the signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

Or, the signal decision section 3 may include a hard decision section for outputting a false reference signal corresponding to an input signal thereto, and the signal decision error detection section 6 may detect a signal decision error normalized at a predetermined position on a vector plane from input and output information to and from the hard decision section. In this instance, the phase intercept variation prediction section 5A may include a first predictor for predicting a phase intercept variation of the transmission signal based on the normalized signal decision error information obtained by the signal decision error detection section 6 and the output of the frequency offset prediction section 4A, a second predictor for predicting the phase intercept variation of the transmission signal based on the normalized signal decision error information obtained by the signal decision error detection section 6 and a signal obtained by multiplying the output of the frequency offset prediction section 4A by an integral number, and an adder for adding the output of the first predictor and the output of the second predictor.

Otherwise, the signal decision section 3 may include a hard decision section for outputting a false reference signal corresponding to an input signal thereto, and a soft decision section for receiving the false reference signal and a hard decision input signal from the hard decision section to perform error correction, and the signal decision error detection section 6 may detect a signal decision error normalized at a predetermined position on a vector plane from input information to the hard decision section and output information of the soft decision section. In this instance, the phase intercept variation prediction section 5A may include a first predictor for predicting a phase intercept variation of the transmission signal based on the normalized signal decision error information obtained by the signal decision error detection section 6 and the output of the frequency offset prediction section 4A, a second predictor for predicting the phase intercept variation of the transmission signal based on the normalized signal decision error information obtained by the signal decision error detection section 6 and a signal obtained by multiplying the output of the frequency offset prediction section 4A by an integral number, and an adder for adding the output of the first predictor and the output of the second predictor.

Or else, the signal decision section 3 may include a hard decision section for outputting a false reference signal corresponding to a signal from the adder 5B which adds the output of the multiplier 4B and the output of the phase intercept variation prediction section 5A and inputs a result of the addition to the signal decision section 3, and the carrier phase control circuit may further comprise a normalization section for normalizing an input signal to the hard decision section at a predetermined position on a vector plane based on the input signal to the hard decision section and a false reference signal from the hard decision section, the frequency offset removal section 4 predicting and removing an offset of the frequency of the transmission signal based on the output of the normalization section.

In the carrier phase control circuit described above, as seen in FIG. 2, the frequency offset removal section 4 predicts and removes an offset of the frequency of a transmission signal based on the output of the automatic equalizer 2.

In particular, the frequency offset prediction section 4A predicts an offset of the frequency of the transmission signal based on the output of the automatic equalizer 2, and the multiplier 4B multiplies the output of the frequency offset prediction section 4A and the output of the automatic equalizer 2 to predict and remove the offset of the frequency of the transmission signal.

Further, the phase intercept variation prediction section 5A of the phase intercept variation removal section 5 predicts a phase intercept variation of the transmission signal based on information of a signal decision error obtained by the signal decision error detection section 6 and the output of the frequency offset prediction section 4A of the frequency offset removal section 4, and the adder 5B adds the output of the phase intercept variation prediction section 5A and the output of the multiplier 4B and inputs a signal, from which the phase intercept variation has been removed, to the signal decision section 3.

Further, in the phase intercept variation prediction section 5A, the correlation calculation section may calculate a correlation between the signal decision error information obtained by the signal decision error detection section 6 and the output of the frequency offset prediction section 4A, and the updating section may update the output of the correlation calculation section. Then, the multiplication section may multiply the output of the updating section and the output of the frequency offset prediction section 4A to predict the phase intercept variation of the transmission signal.

Or, in the phase intercept variation prediction section 5A, the first predictor may predict the phase intercept variation of the transmission signal based on the signal decision error information obtained by the signal decision error detection section 6 and the output of the frequency offset prediction section 4A, and the second predictor may predict the phase intercept variation of the transmission signal based on the signal decision error information obtained by the signal decision error detection section 6 and a signal obtained by multiplying the output of the frequency offset prediction section 4A by an integral number. Then, the adder may add the output of the first predictor and the output of the second predictor to predict the phase intercept variation of the transmission signal.

In this instance, in the first predictor, the correlation calculation section may calculate a correlation between the signal decision error information obtained by the signal decision error detection section 6 and the output of the frequency offset prediction section 4A, and the updating section may update the output of the correlation calculation section, and then, the multiplication section may multiply the output of the updating section and the output of the frequency offset prediction section 4A. Then, in the second predictor, the correlation calculation section may calculate a correlation between the signal decision error information obtained by the signal decision error detection section 6 and the output of the frequency offset prediction section 4A, and the updating section may update the output of the correlation calculation section, and then, the multiplication section may multiply the output of the updating section and the output of the frequency offset prediction section 4A.

Otherwise, in the signal decision section 3, the hard decision section may output a false reference signal corresponding to an input signal thereto, and the signal decision error detection section 6 may detect a signal decision error from input and output information to and from the hard decision section. In this instance, in the phase intercept variation prediction section 5A, the first predictor may predict a phase intercept variation of the transmission signal based on the signal decision error information obtained by the signal decision error detection section 6 and the output of the frequency offset prediction section 4A, and the second predictor may predict the phase intercept variation of the transmission signal based on the signal decision error information obtained by the signal decision error detection section 6 and a signal obtained by multiplying the output of the frequency offset prediction section 4A by an integral number, and then, the adder may add the output of the first predictor and the output of the second predictor.

Or, in the signal decision section 3, the hard decision section may output a false reference signal corresponding to an input signal thereto, and the soft decision section may receive the false reference signal and a hard decision input signal from the hard decision section to perform error correction. Further, the signal decision error detection section 6 may detect a signal decision error from input information to the hard decision section and output information of the soft decision section. In this instance, in the phase intercept variation prediction section 5A, the first predictor may predict a phase intercept variation of the transmission signal based on the signal decision error information obtained by the signal decision error detection section 6 and the output of the frequency offset prediction section 4A, and the second predictor may predict the phase intercept variation of the transmission signal based on the signal decision error information obtained by the signal decision error detection section 6 and a signal obtained by multiplying the output of the frequency offset prediction section 4A by an integral number, and then the adder may add the output of the first predictor and the output of the second predictor.

Else, in the signal decision section 3, the hard decision section may output a false reference signal corresponding to an input signal thereto, and the signal decision error detection section 6 may detect a signal decision error normalized at a predetermined position on a vector plane from input and output information to and from the hard decision section. In this instance, in the phase intercept variation prediction section 5A, the first predictor may predict a phase intercept variation of the transmission signal based on the normalized signal decision error information obtained by the signal decision error detection section 6 and the output of the frequency offset prediction section 4A, and the second predictor may predict the phase intercept variation of the transmission signal based on the normalized signal decision error information obtained by the signal decision error detection section 6 and a signal obtained by multiplying the output of the frequency offset prediction section 4A by an integral number, and then, the adder may add the output of the first predictor and the output of the second predictor.

Or else, in the signal decision section 3, the hard decision section may output a false reference signal corresponding to an input signal thereto whereas the soft decision section receives the false reference signal and a hard decision input signal from the hard decision section to perform error correction, and the signal decision error detection section 6 may detect a signal decision error normalized at a predetermined position on a vector plane from input information to the hard decision section and output information of the soft decision section. In this instance, in the phase intercept variation prediction section 5A, the first predictor may predict a phase intercept variation of the transmission signal based on the normalized signal decision error information obtained by the signal decision error detection section 6 and the output of the frequency offset prediction section 4A, and the second predictor may predict the phase intercept variation of the transmission signal based on the normalized signal decision error information obtained by the signal decision error detection section 6 and a signal obtained by multiplying the output of the frequency offset prediction section 4A by an integral number, and then, the adder may add the output of the first predictor and the output of the second predictor.

Or else, in the signal decision section 3, the hard decision section may output a false reference signal corresponding to a signal from the adder 5B which adds the output of the multiplier 4B and the output of the phase intercept variation prediction section 5A and inputs a result of the addition to the signal decision section 3. Then, the normalization section may normalize an input signal to the hard decision section at a predetermined position on a vector plane based on the input signal to the hard decision section and the false reference signal from the hard decision section, and the frequency offset removal section 4 may predict and remove an offset of the frequency of the transmission signal based on the output of the normalization section.

Accordingly, with the carrier phase control circuit described above, since a phase intercept variation can be removed from a transmission signal, if the carrier phase control circuit is applied to such a very high speed modem that has a communication speed of, for example, 28.8 kbps, occurrence of a communication error can be suppressed. Consequently, there is an advantage in that the characteristic of the very high speed modem can be improved remarkably, and this contributes very much to putting of the modem into practical use.

Further, with the carrier phase control circuit, since a phase intercept variation is predicted by adding a phase intercept variation predicted by the first predictor and another phase intercept variation predicted by the second predictor based on signal decision error information and a signal obtained by multiplying the output of the frequency offset prediction section by an integral number, a phase intercept variation can be removed similarly as described hereinabove. Further, since a phase intercept variation of a higher degree of accuracy can be predicted, removal of the phase intercept variation can be performed with a high degree of accuracy by the phase intercept variation removal section. Consequently, the carrier phase control circuit is advantageous also in that, if it is applied to such a very high speed modem that has a communication speed of, for example, 28.8 kbps, occurrence of a communication error can be suppressed with a high degree of accuracy.

Furthermore, with the carrier phase control circuit described above, since an offset of a frequency is predicted and removed based on a signal normalized at a predetermined position on a vector plane, a phase intercept variation can be removed similarly as described above and calculation for prediction of a frequency offset can be performed in a simplified manner. Consequently, the carrier phase control circuit is advantageous also in that, if it is applied to such a very high speed modem that has a communication speed of, for example, 28.8 kbps, occurrence of a communication error can be suppressed by simplified calculation processing.

In addition, with the carrier phase control circuit, since a phase intercept variation is predicted by adding a phase intercept variation predicted by the first predictor and another phase intercept variation predicted by the second predictor based on signal decision error information and a signal obtained by multiplying the output of the frequency offset prediction section by an integral number and besides a frequency offset is predicted and removed based on a signal normalized at a predetermined position on a vector plane, the phase intercept variation can be removed with a higher degree of accuracy similarly as described above and calculation for prediction of a frequency offset can be performed in a simplified manner. Consequently, the carrier phase control circuit is advantageous also in that, if it is applied to such a very high speed modem that has a communication speed of, for example, 28.8 kbps, occurrence of a communication error can be suppressed with a high degree of accuracy by simplified calculation processing.

Figure 3:
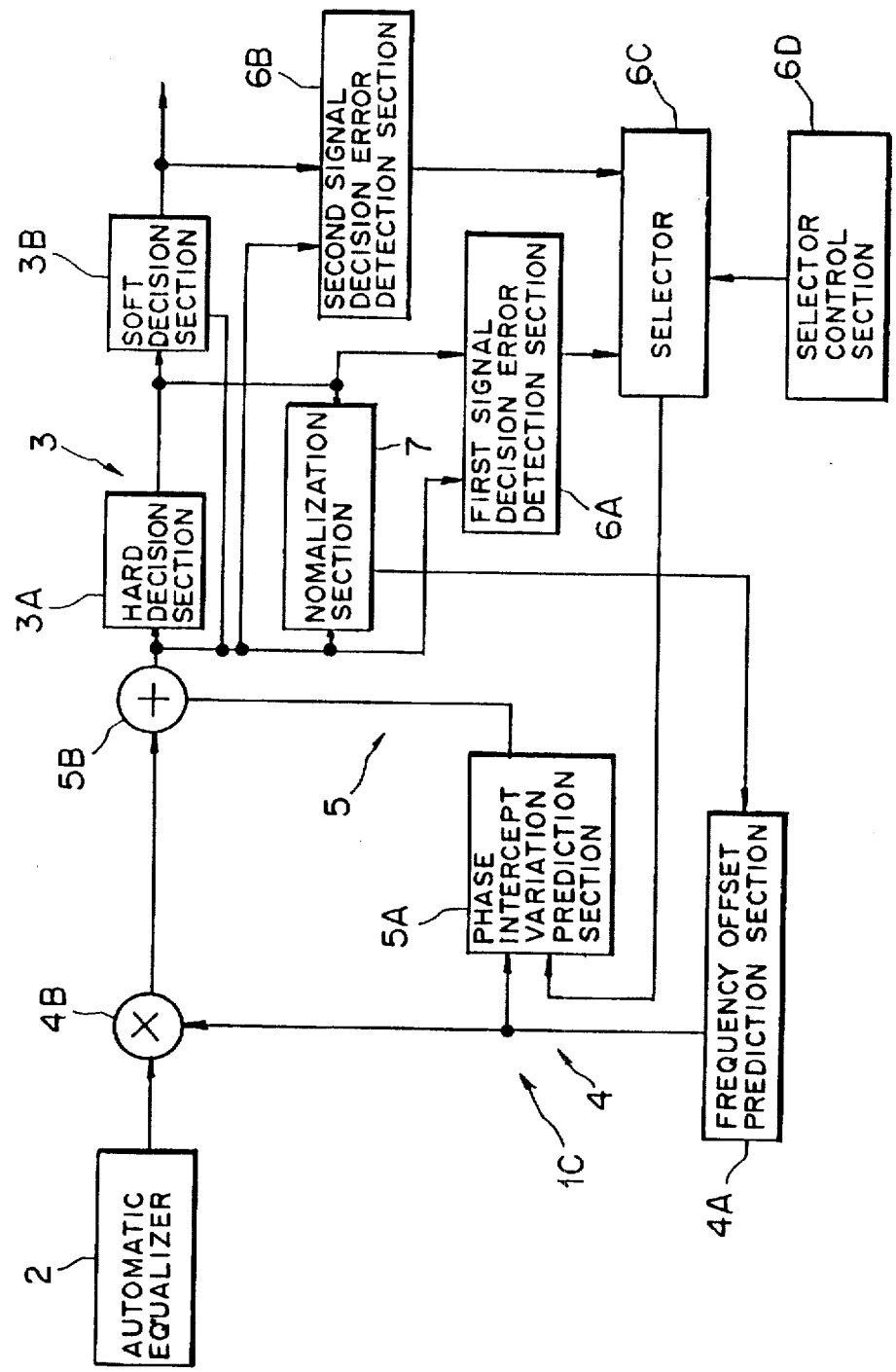

Referring now to FIG. 3, there is shown in block diagram a carrier phase control circuit according to a further aspect of the present invention. The carrier phase control circuit shown is generally denoted at 1C and is provided on a reception side of a communication apparatus and interposed between an automatic equalizer 2 and a signal decision section 3 of the communication apparatus which includes a hard decision section 3A for outputting a false reference signal corresponding to an input signal thereto and a soft decision section 3B for receiving the false reference signal and a hard decision input signal from the hard decision section 3A to perform error correction.

The carrier phase control circuit 1C includes a normalization section 7 which normalizes an input signal to the hard decision section 3A at a predetermined position on a vector plane based on the input signal to the hard decision section 3A and a false reference signal from the hard decision section 3A.

The carrier phase control circuit 1C further includes a frequency offset removal section 4 for predicting and removing an offset of the frequency of a transmission signal based on the output of the normalization section 7, and includes a frequency offset prediction section 4A and a multiplier 4B.

The frequency offset prediction section 4A predicts an offset of the frequency of a transmission signal based on the output of the normalization section 7. The multiplier 4B multiplies the output of the frequency offset prediction section 4A and the output of the automatic equalizer 2 to remove an offset of the frequency of a transmission signal.

The carrier phase control circuit 1C further includes a first signal decision error detection section 6A for detecting a signal decision error normalized at a predetermined position on a vector plane from input and output information to and from the hard decision section 3A, a second signal decision error detection section 6B for detecting a signal decision error normalized at a predetermined position on the vector plane from the input information to the hard decision section 3A and output information from the soft decision section 3B, and a selector 6C for selectively outputting information of the normalized signal decision error from the first signal decision error detection section 6A or the second signal decision error detection section 6B.

The carrier phase control circuit 1C further includes a phase intercept variation removal section 5 for predicting and removing a phase intercept variation of a transmission signal based on normalized signal decision error information selectively outputted from the selector 6C and the output of the frequency offset prediction section 4A. The phase intercept variation removal section 5 includes a phase intercept variation prediction section 5A and an adder 5B.

The phase intercept variation prediction section 5A predicts a phase intercept variation of a transmission signal based on normalized signal decision error information selectively outputted from the selector 6C and the output of the frequency offset prediction section 4A. The adder 5B adds the output of the phase intercept variation prediction section 5A and the output of the multiplier 4B to remove a phase intercept variation from the transmission signal and inputs a resulted signal to the hard decision section 3A.

The carrier phase control circuit 1C further includes a selector control section 6D which controls the selector 6C to select, upon leading-in of a signal, normalized signal decision error information from the first signal decision error detection section 6A but select, in ordinary operation after such signal leading-in, normalized signal decision error information from the second signal decision error detection section 6B.

In the carrier phase control circuit described above, as seen in FIG. 3, the normalization section 7 normalizes an input signal to the hard decision section 3A at a predetermined position on a vector plane based on the input signal to the hard decision section 3A and a false reference signal from the hard decision section 3A.

The frequency offset removal section 4 predicts and removes an offset of the frequency of a transmission signal based on the output of the normalization section 7. In particular, the frequency offset prediction section 4A of the frequency offset removal section 4 predicts an offset of the frequency of the transmission signal based on the output of the normalization section 7, and the multiplier 4B multiplies the output of the frequency offset prediction section 4A and the output of the automatic equalizer 2 to remove the offset of the frequency of the transmission signal.

Further, the first signal decision error detection section 6A detects a signal decision error normalized at a predetermined position on the vector plane from input and output information to and from the hard decision section 3A, and the second signal decision error detection section 6B detects a signal decision error normalized at a predetermined position on the vector plane from the input information to the hard decision section 3A and output information from the soft decision section 3B. Then, the selector 6C selectively outputs information of the normalized signal decision error from the first signal decision error detection section 6A or the second signal decision error detection section 6B.

Further, the phase intercept variation removal section 5 predicts and removes the phase intercept variation of the transmission signal based on the normalized signal decision error information selectively outputted from the selector 6C and the output of the frequency offset prediction section 4A.

In particular, the phase intercept variation prediction section 5A of the phase intercept variation section 5 predicts the phase intercept variation of the transmission signal based on the normalized signal decision error information selectively outputted from the selector 6C and the output of the frequency offset prediction section 4A, and the adder 5B adds the output of the phase intercept variation prediction section 5A and the output of the multiplier 4B to remove the phase intercept variation from the transmission signal and inputs a resulted signal to the hard decision section 3A.

Then, the selector control section 6D controls the selector 6C so that the selector 6C selects, upon leading-in of a signal, normalized signal decision error information from the first signal decision error detection section 6A, but selects, in ordinary operation after such signal leading-in, normalized signal decision error information from the second signal decision error detection section 6B.

Accordingly, with the carrier phase control circuit described above, since the selector is controlled by the selector control section so that it selects, upon signal leading-in, normalized signal decision error information from the first signal decision error detection section but selects, in ordinary operation after such signal leading-in, normalized signal decision error information from the second signal decision error detection section, calculation for prediction of a phase intercept variation can be performed readily and removal of the phase intercept variation can be performed with a higher degree of accuracy similarly as described hereinabove. Besides, calculation for prediction of a phase intercept variation can be performed efficiently in response to a condition of a signal. Consequently, the carrier phase control circuit is advantageous also in that, if it is applied to such a very high speed modem that has a communication speed of, for example, 28.8 kbps, occurrence of a communication error can be suppressed efficiently with a high degree of accuracy by simplified calculation processing.

b. Description of the Preferred Embodiment

Figure 4:
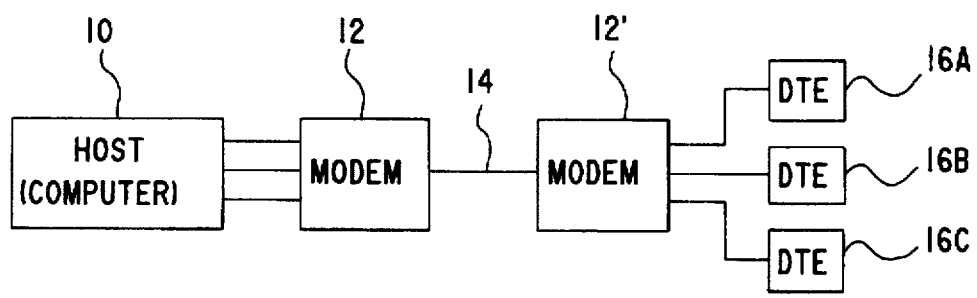
FIG. 4 is a block diagram of an on-line system to which the present invention is applied.

Referring to FIG. 4, there is shown in block diagram an on-line system to which the present invention is applied. The on-line system shown includes a host computer 10, a modem 12 connected to the host computer 10 by way of a communication control apparatus (CCP) (not shown), and a modem 12' located at another location and connected to the modem 12 by way of an analog line (private line) 14. Terminals 16A to 16C serving as working stations are connected to the modem 12'.

The modems 12 and 12' are each constructed as a very high speed modem having a communication speed of, for example, 28.8 kbps. Each of the modems 12 and 12' time division processes and modulates, for example, a main channel for three main data and a secondary channel for a secondary data for supervision of the network and transmits a resulted signal in accordance with a non-Nyquist transmission system whereas it demodulates a reception signal to regenerate such individual data (main data and secondary data). Further, each of the modems 12 and 12' transmits, prior to transmission of data, training data having a training pattern which will be hereinafter described, so that initialization processing of a reception section can be performed using the training data.

Figure 6:
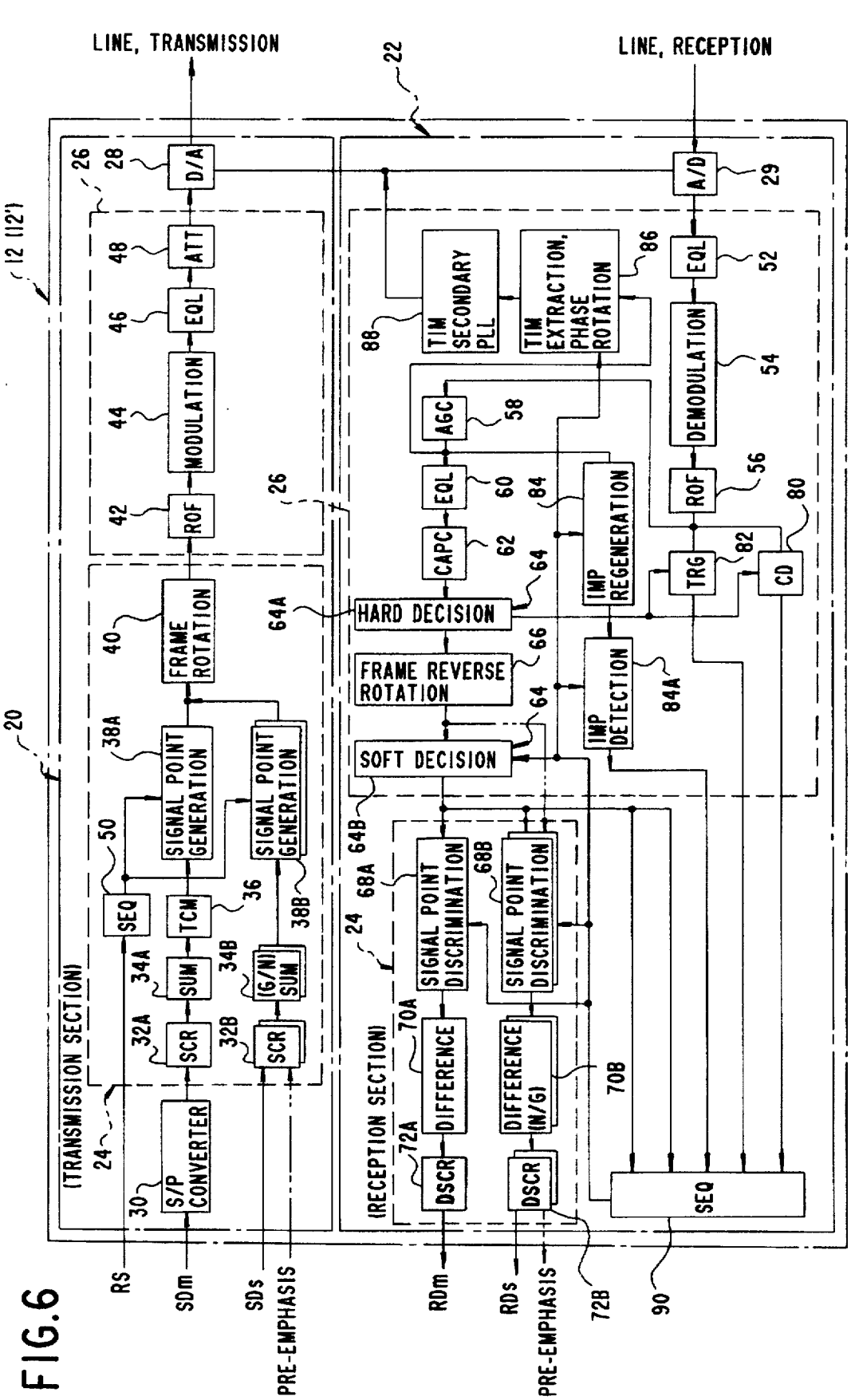
FIG. 6 is a block diagram showing details of the modem shown in FIG. 4.

The modem 12 which serves as a parent station includes, in order to exhibit the functions described above, a transmission section 20 with a modulation function and a reception section 22 with a demodulation function as shown in FIG. 6, and further includes a transmission low-pass filter and a transmission amplifier (not shown) on the output side of the transmission section 20 and a reception amplifier and a reception low-pass filter (not shown) on the input side of the reception section 22.

Figure 5:
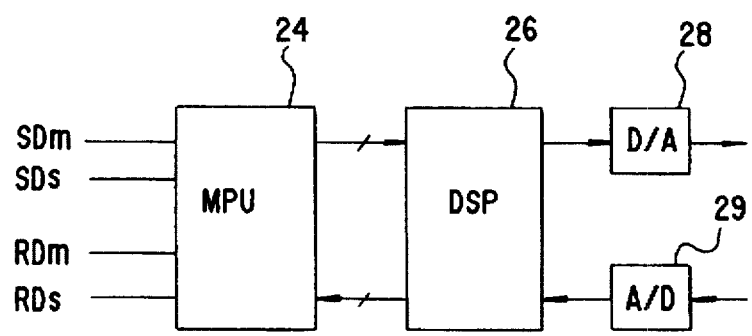
FIG. 5 is a block diagram showing a construction of a component of a modem employed in the on-line system of FIG. 4.

Each of the transmission section 20 and the reception section 22 is formed from, as shown in FIG. 5, a microprocessor unit (MPU) 24, a digital signal processor (DSP) 26, a digital to analog converter (D/A) 28 and an analog to digital converter (A/D) 29. Each of the MPU 24 and the DSP 26 constituting the transmission section 20 or the reception section 22 is provided suitably by a plural number depending upon the capacity or the processing capability required therefor.

Essential part of the modem 12 will be described in more detail. Referring to FIG. 6, the transmission section 20 of the modem 12 includes a serial to parallel converter (S/P converter) 30, a pair of scramblers (SCR) 32A and 32B, a pair of sum calculation sections 34A and 34B, a trellis-coded modulation section (TCM) 36, a pair of signal point generation sections 38A and 38B, a frame rotation section 40, a roll-off filter (ROF) 42, a modulation section 44, a fixed equalization section (EQL) 46, an attenuator (ATT) 48, a sequencer (SEQ) 50 serving as a control section, and so forth.

The serial to parallel converter 30 converts main channel data SDm from serial data into parallel data. The scramblers 32A and 32B individually randomize signals (main channel data SDm and secondary data SDs, and pre-emphasis data).

The sum calculation section 34A performs a sum calculation of the output of the scrambler 32A while the other sum calculation section 34B performs a sum calculation of the output of the scrambler 32B. The sum calculation section 34B also has a gray to natural code conversion function which is used upon training. The reason why the sum calculations of the two data are performed by the sum calculation sections 34A and 34B is that the transmission data are transmitted as relative difference data regarding preceding and following points of time. The trellis-coded modulation section 36 performs processing for correction of errors.

The signal point generation sections 38A and 38B generate desired signal points from the main channel data SDm and the secondary data SDs, respectively, but produce, upon initialization, training data, which will be hereinafter described, in response to a control signal from the sequencer 50.

The frame rotation section 40 rotates a frame in order to perform re-leading-in when a step-out occurs. The roll-off filter 42 passes only signals of a digital output within a predetermined frequency range therethrough and thus has a function of a low-pass filter.

The modulation section 44 performs modulation processing of the output of the roll-off filter 42 and has a carrier frequency set, for example, to 1,850 Hz.

The fixed equalization section 46 equalizes a delay, an amplitude component on a line and so forth. The attenuator 48 adjusts the level of the output of the fixed equalization section 46.

The sequencer 50 serving as a control section controls the function sections 30 to 48 of the transmission section 20 described above. The sequencer 50 also controls, upon initialization, the signal point generation sections 38A and 38B so as to produce training data which will be hereinafter described. Details of the control will be hereinafter described in detail.

The functions of the scramblers 32A and 32B, sum calculation sections 34A and 34B, trellis-coded modulation section 36, signal point generation sections 38A and 38B, frame rotation section 40 and sequencer 50 of the transmission section 20 are provided by the MPU 24, and the functions of the roll-off filter 42, modulation section 44, fixed equalization section 46 and attenuator 48 are provided by the DSP 26.

The reception section 22 of the modem 12 includes a fixed equalizer (EQL) 52, a demodulation section 54, a roll-off filter (band separation filter) (ROF) 56, an automatic gain control section (AGC) 58, an automatic equalization section (EQL) 60, a carrier phase correction section (CAPC) 62, a hard decision section 64A, a frame reverse rotation section 66, a soft decision section 64B, a pair of signal point discrimination sections 68A and 68B, a pair of difference calculation sections 70A and 70B, and a pair of descramblers 72A and 72B. The reception section 22 further includes a carrier detection section (CD) 80, a training data detection section (TRG) 82, an impulse (IMP) regeneration section 84, an impulse (IMP) detection section 84A, a timing (TIM) extraction section 86, a timing locking section (TIM secondary PLL) 88, a sequencer (SEQ) 90 serving as a control section, and so forth.

The fixed equalizer 52 equalizes a delay, an amplitude component on a line and so forth. The demodulation section 54 demodulates a reception signal after converted into a digital signal by the analog to digital converter 29. The roll-off filter 56 passes only a signal of the digital output of the demodulation section 54 within a predetermined frequency range, and a decimation filter is used for the roll-off filter 56.

The automatic gain control section 58 constructs automatic reception level adjustment means which adjusts the loop gain so that the level of a demodulated signal band-limited by the roll-off filter 56 may be a predetermined reference value and inputs the demodulated signal of the thus adjusted level to the automatic equalization section 60 at the following stage. The automatic gain control section 58 is thus required to allow the automatic equalization section 60 at the following stage to operate accurately.

The automatic equalization section (automatic equalizer) 60 performs equalization processing to correct a transmission distortion of a line and so forth. The carrier phase correction section (carrier phase control section) 62 which serves as a carrier phase control circuit predicts a frequency offset, phase jitters or a phase intercept variation from the output of the automatic equalization section 60 and removes (or suppresses) the same to correct the carrier phase as hereinafter described.

The hard decision section 64A outputs a false reference signal corresponding to an input signal thereto. The soft decision section 64B receives the false reference signal and a hard decision input signal from the hard decision section 64A and performs viterbi decoding or the like to correct an error of an input signal thereto. The hard decision section 64A and the soft decision section 64B function each as a pre-signal discrimination section 64.

The frame reverse rotation section 66 is provided to eliminate a step-out condition. The signal point discrimination section 68A discriminates signal points of main data while the other signal point discrimination section 68B discriminates signal points of secondary data in an ordinary operation. However, upon training, the signal point discrimination section 68B discriminates four values of the output of the frame reverse rotation section 66 (secondary data which have not undergone discrimination by the soft decision section 64B).

The difference calculation section 70A performs a difference calculation of the output of the signal point discrimination section 68A while the other difference calculation section 70B performs a difference calculation of the output of the signal point discrimination section 68B. The difference calculation section 70B also has a natural to gray code conversion function which is used upon training. The difference calculation sections 70A and 70B have a function of returning transmitted relative difference data into original data.

The descramblers 72A and 72B process signals randomized by the scramblers 32A and 32B to obtain original signals and output the thus obtained signals as main data RDm and secondary data RDs, respectively.

The carrier detection section 80 detects a carrier to detect whether or not data are received. The output of the carrier detection section 80 is supplied to the sequencer 90.

The training data detection section 82 detects training data to detect the beginning of training. Also the output of the training data detection section 82 is supplied to the sequencer 90.

The impulse regeneration section 84 regenerates an impulse from training data, and the impulse detection section 84A detects the impulse regenerated by the impulse regeneration section 84. Also the output of the impulse detection section 84A is supplied to the sequencer 90.

The timing extraction section 86 extracts a signal timing from the output of the automatic gain control section 58 and discriminates at which position the signal timing is. The timing locking section 88 locks the output of the timing extraction section 86 using a PLL (phase-locked loop) circuit.

The sequencer 90 serving as a control section controls the function units 52 to 88 of the reception section 22 described above.

It is to be noted that each alternate long and two short dashes line of the secondary data transmission and reception systems shown in FIG. 6 represents a flow of a signal or data upon training.

The functions of the fixed equalizer 52, demodulation section 54, roll-off filter 56, automatic gain control section 58, automatic equalization section 60, carrier phase correction section 62, hard decision section 64A, frame reverse rotation section 66, soft decision section 64B, carrier detection section 80, training data detection section 82, impulse regeneration section 84, impulse detection section 84A, timing extraction section 86 and timing locking section 88 of the reception section 22 are provided by the DSP 26, and the functions of the signal point discrimination sections 68A and 68B, difference calculation sections 70A and 70B, and descramblers 72A and 72B are provided by the MPU 24.

It is to be noted that also the modem 12' serving as a child station has the same construction as that of the modem 12 serving as a parent station, and accordingly, overlapping description of the same is omitted herein to avoid redundancy.

The carrier phase control section 62 described above will be described in more detail below.

Figure 7:
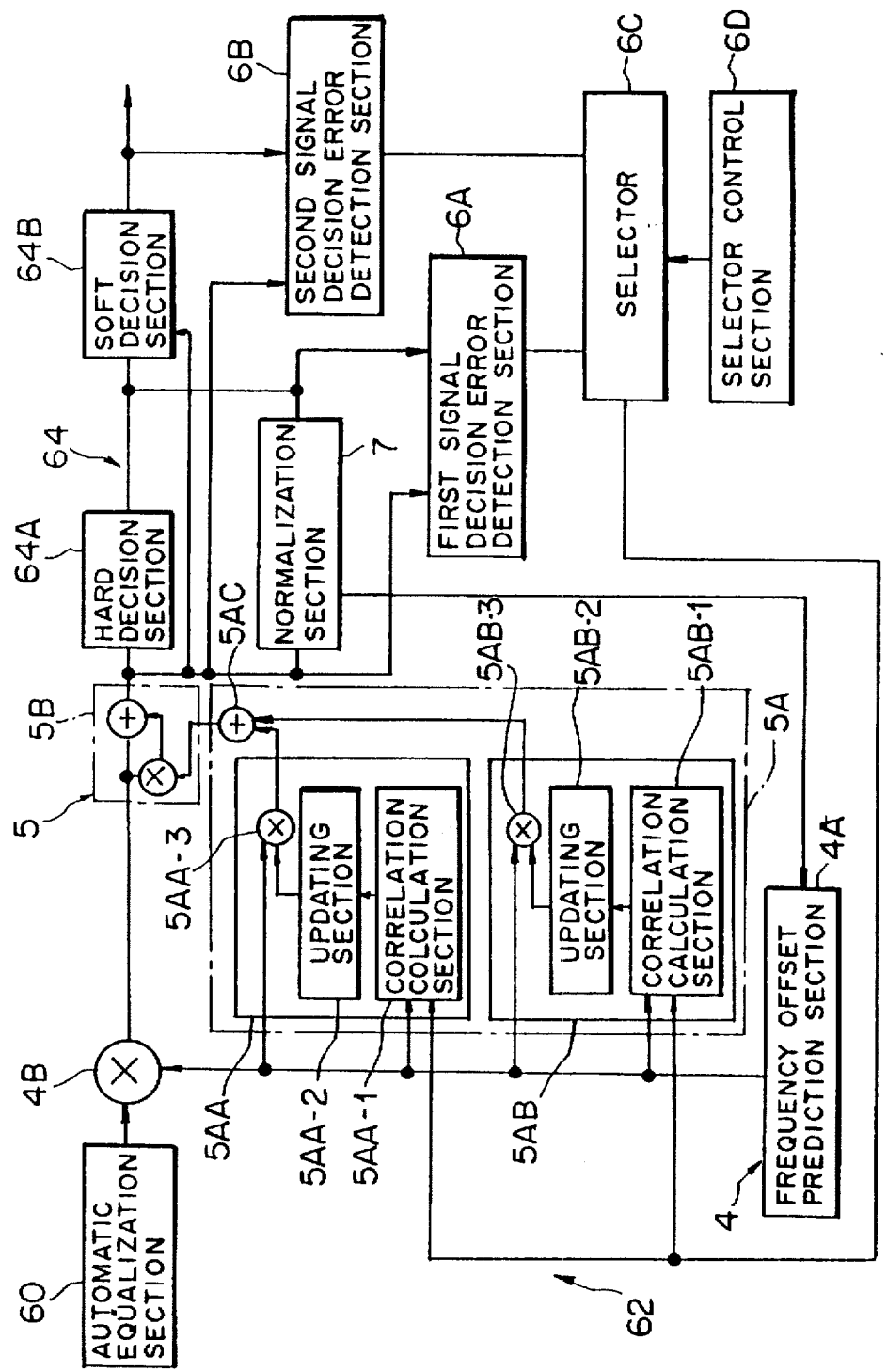
FIGS. 7 to 9 are block diagrams of a carrier phase control circuit showing a preferred embodiment of the present invention.

Referring to FIG. 7, the carrier phase control section (carrier phase control circuit) 62 is shown in block diagram. The carrier phase control section 62 shown is provided on the reception side of the modem as a communication apparatus and interposed between the automatic equalization section 60 and the pre-signal decision section 64 which includes the hard decision section 64A for outputting a false reference signal corresponding to an input signal thereto and the soft decision section 64B for receiving the false reference signal and a hard decision input signal from the hard decision section 64A to perform error correction.

Figure 8:
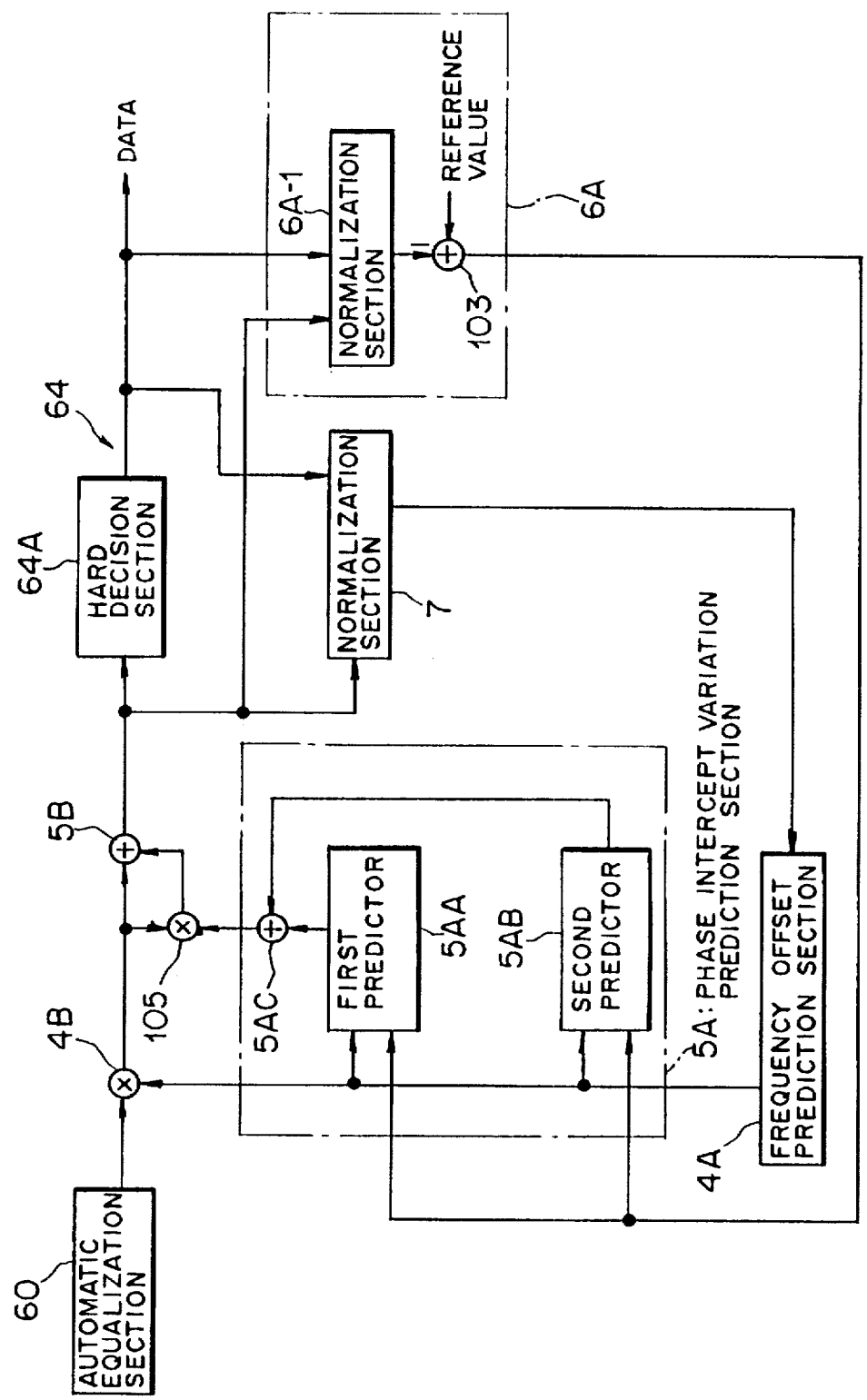
Figure 9:
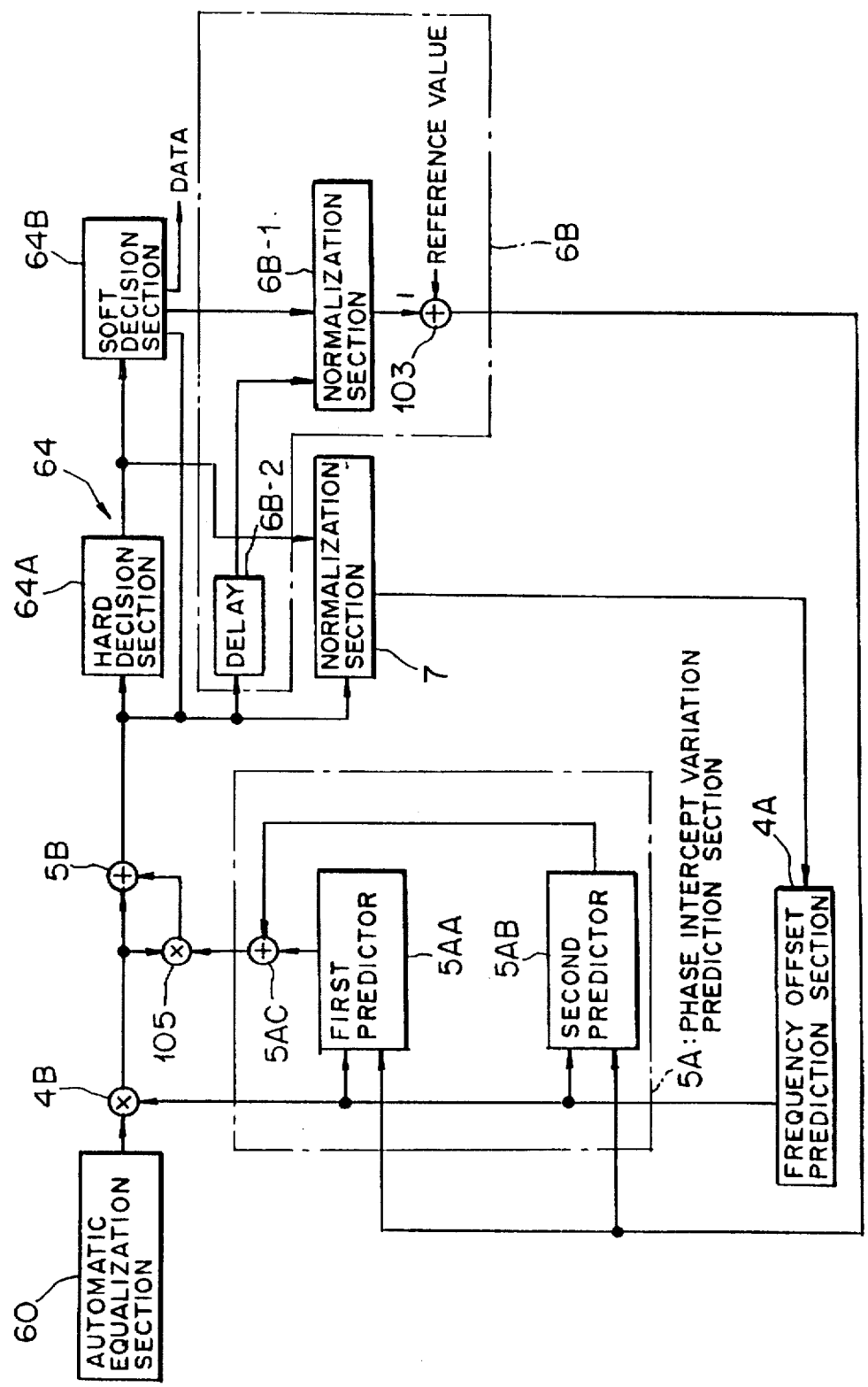

The carrier phase control section 62 is constructed in such manners as shown in the block diagrams of FIGS. 8 and 9 upon leading-in of a signal and upon ordinary or steady operation after such signal leading-in, respectively, as hereinafter described. In other words, the carrier phase control section 62 operates as if it have such constructions as shown in FIGS. 8 and 9 upon signal leading-in and upon ordinary operation after such signal leading-in, respectively. A similar representation is applied to FIGS. 10 and 12. In particular, FIGS. 10 and 12 show more detailed circuit constructions of the carrier phase control section 62 upon signal leading-in and upon ordinary operation after such signal leading-in, respectively.

Figure 10:
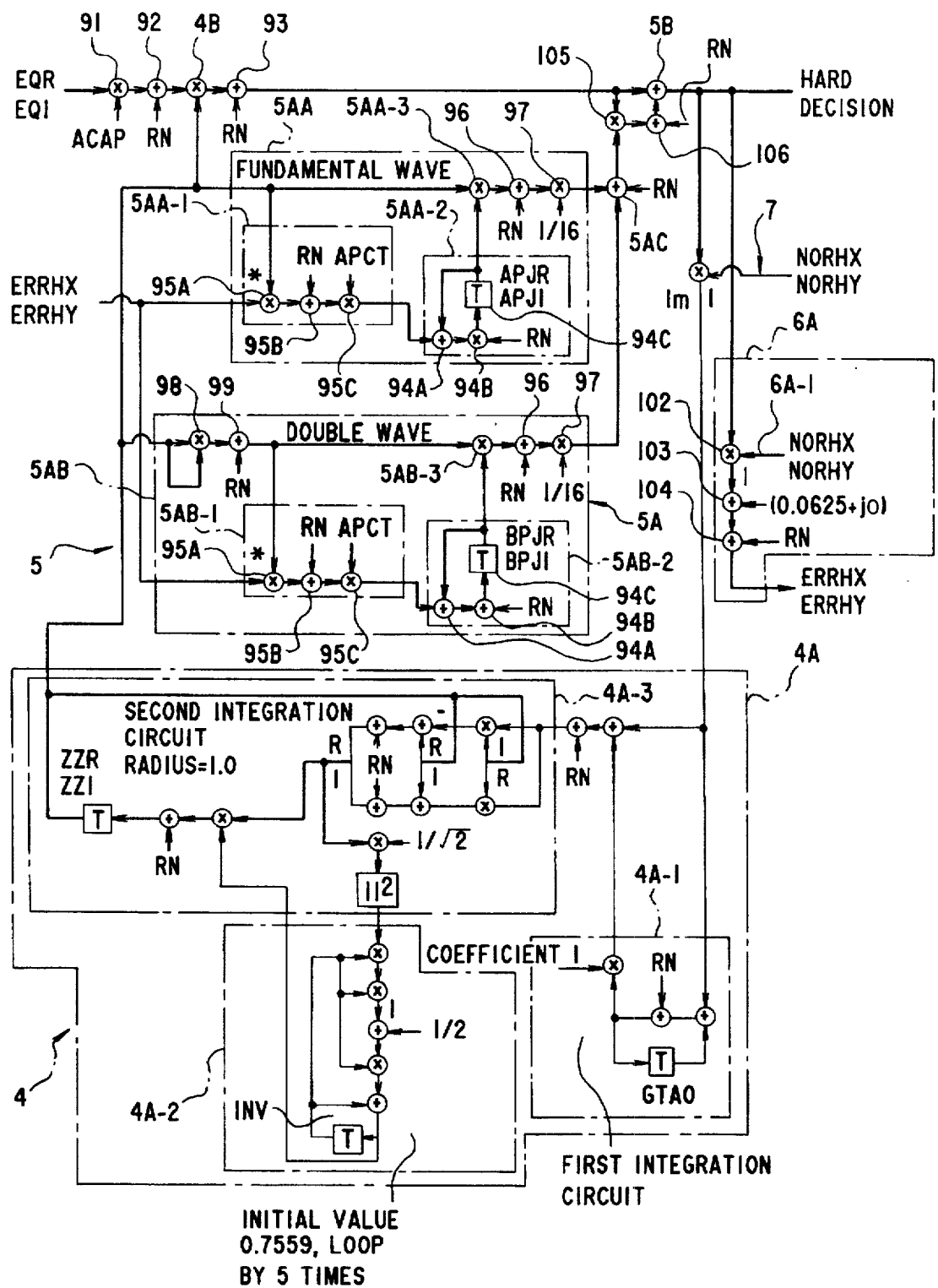
FIG. 10 is a circuit diagram showing a detailed construction of the carrier phase control section shown in FIG. 7.
Figure 12:
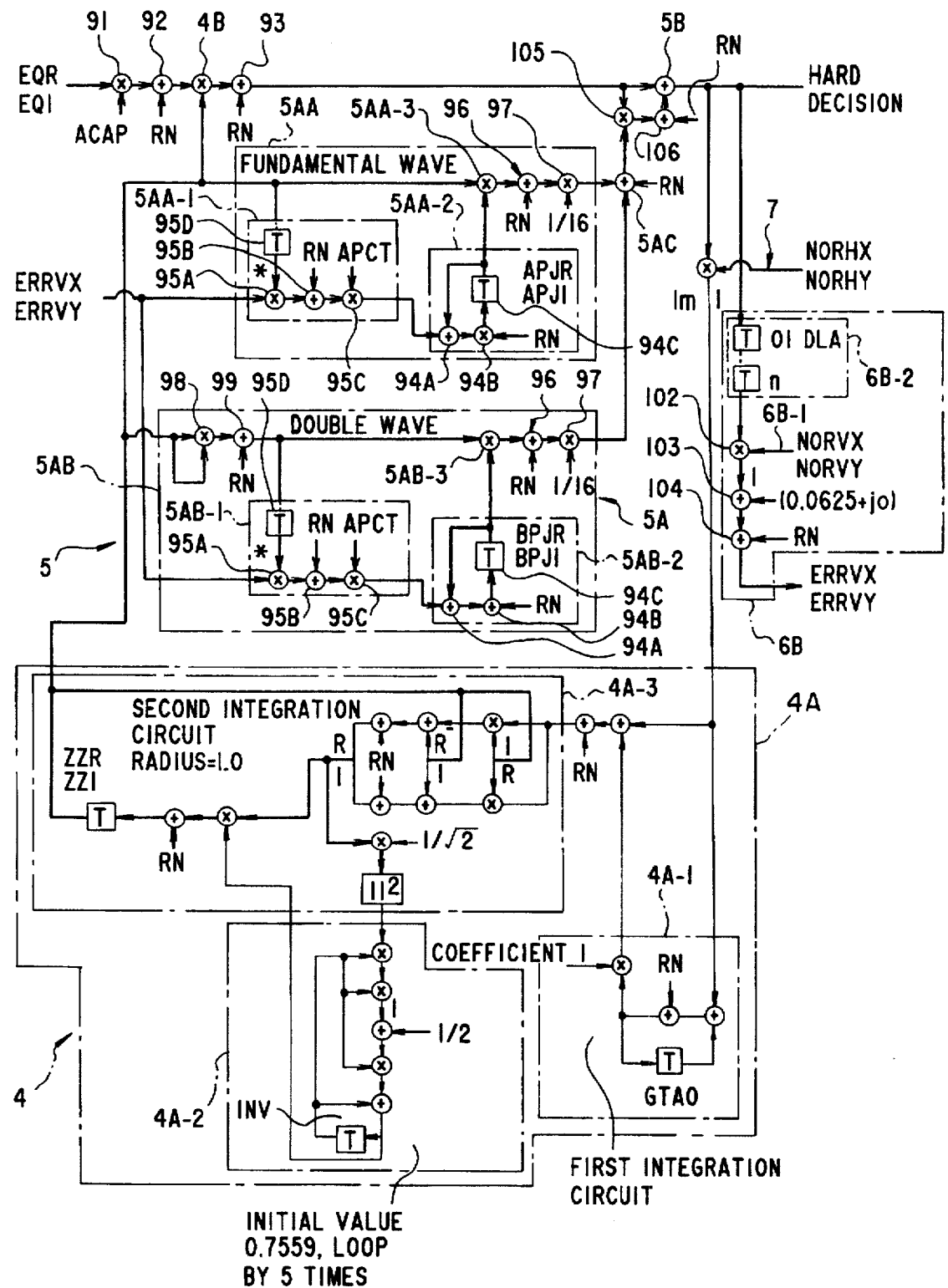
FIG. 12 is a circuit diagram showing a detailed construction of the carrier phase control circuit shown in FIG. 7 but in a different operation condition from that shown in FIG. 10.

It is to be noted that, in FIGS. 10 to 12, each element denoted by the reference symbol "+" is an addition section; denoted by "x" is a multiplication section: denoted by "T" is a delay section: denoted by the reference symbols "+" and "RN" is a rounding processing section: denoted by the reference character "R" is a calculation section for calculating a real part of a composite number: and denoted by "I" is a calculation section for calculating an imaginary part of a complex number.

The carrier phase control section 62 includes a normalization section 7 which normalizes an input signal to the hard decision section 64A at a predetermined position on a vector plane based on the input signal to the hard decision section 64A and a false reference signal from the hard decision section 64A. The normalization section 7 particularly includes a normalized vector generation section 101 and a multiplication section 102 as seen in FIG. 11.

The carrier phase control section 62 further includes a frequency offset removal section 4 which predicts and removes an offset of the frequency of a transmission signal based on the output of the normalization section 7. The frequency offset removal section 4 includes a frequency offset prediction section 4A and a multiplier 4B.

The frequency offset prediction section 4A predicts an offset of the frequency of a transmission signal based on the output of the normalization section 7. In particular, the frequency offset prediction section 4A includes, as shown in FIG. 10 or 12, a first integration circuit 4A-1 which calculates a frequency offset amount obtained upon training, a normalization section 4A-2 which performs a reciprocal calculation to normalize the amplitude, and a second integration circuit 4A-3 which rotates the phase of the transmission signal in the opposite direction.

The carrier phase control section 62 further includes a multiplication section 91 which adjust the level of a signal from the automatic equalization section 60, and a rounding processing section 92 for performing rounding processing of a signal having a level adjusted by the multiplication section 91.

The multiplier 4B of the frequency offset removal section 4 multiplies the output of the frequency offset prediction section 4A and a signal from the rounding processing section 92 as the output of the automatic equalization section 60 to remove an offset of the frequency of the transmission signal. A rounding processing section 93 performs rounding processing of the signal from which the offset of the frequency has been removed by the multiplier 4B.

Thus, the offset ($e^{jwt}$) of a transmission signal in the frequency offset prediction section 4A can be represented by the following equation (1):

$$e^{jwt} = ZZR + jZZI \qquad (1)$$

Referring back to FIG. 7, the carrier phase control section 62 further includes a first signal decision error detection section 6A which detects a signal decision error normalized at a predetermined position on a vector plane from input and output information to and from the hard decision section 64A.

Referring to FIG. 8 or 10, the first signal decision error detection section 6A particularly includes a normalization section 6A-1, an addition section 103 and a rounding processing section 104 (not shown in FIG. 8). The normalization section 6A-1 particularly includes a normalized vector generation section 101 and a multiplication section 102 as shown in FIG. 11.

Accordingly, as seen in FIGS. 10 and 11, the normalized vector generation section 101 generates a normalized vector (NORH) from a signal after hard decision, and the multiplication section 102 multiplies the normalized vector from the normalized vector generation section 101 and a signal before the hard decision. Then, the addition section 103 normalizes the signal obtained by the multiplication of the multiplication section 102 on an X-axis (0.0625+j0), and the rounding processing section 104 performs rounding processing for the thus normalized signal. Consequently, the first signal decision error detection section 6A calculates an error ERRH in accordance with the following equation (2):

$$ERRH = Ref - NORH \cdot (\text{Cancel output}) \qquad (2)$$

where Ref=0.0625+j0.

Referring back again to FIG. 7, the carrier phase control section 62 further includes a second signal decision error detection section 6B which detects a signal decision error normalized at a predetermined position on a vector plane from input information to the hard decision section 64A and output information from the soft decision section 64B.

Referring to FIG. 9 or 12, the second signal decision error detection section 6B particularly includes a normalization section 6B-1, a delay section 6B-2, an addition section 103 and a rounding processing section 104 (not shown in FIG. 9). The normalization section 6B-1 particularly includes a normalized vector generation section 101 and a multiplication section 102 as seen in FIG. 13.

Figure 13:
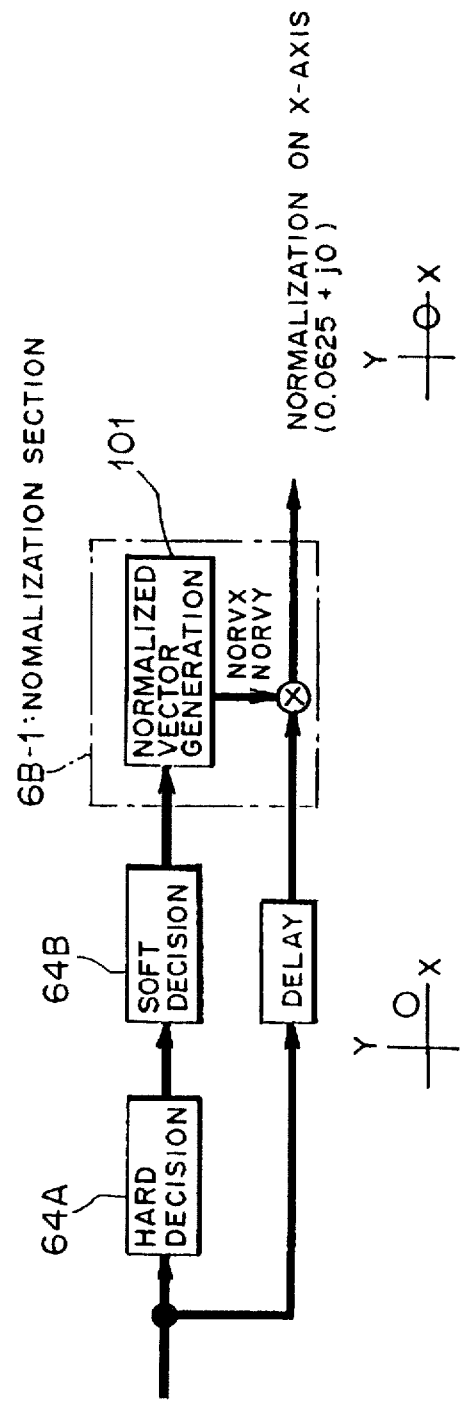
FIG. 13 is a block diagram showing a detailed construction of the normalization section of the carrier phase control circuit shown in FIG. 7 but in a different operation condition from that shown in FIG. 11.

Referring to FIGS. 12 and 13, the normalized vector generation section 101 generates a normalized vector (NORV) from a signal after soft decision, and the multiplication section 102 multiplies the normalized vector from the normalized vector generation section 101 and a signal before the hard decision. Here, the signal before hard decision is delayed by the delay section 6B-2 before it is inputted to the multiplication section 102 in order to adjust the timing.

Thereafter, the addition section 103 normalizes the signal obtained by the multiplication of the multiplication section 102 on the X-axis (0.0625+j0), and the rounding processing section 104 performs rounding processing for the thus normalized signal. Thus, the second signal decision error detection section 6B calculates an error ERRV in accordance with the following equation (3):

$$ERRV = Ref - NORV \cdot (\text{Cancel output}) \qquad (3)$$

where Ref=0.0625+j0.

Referring back again to FIG. 7, the carrier phase control section 62 further includes a selector 6C which selectively outputs normalized signal decision error information from the first signal decision error detection section 6A or the second signal decision error detection section 6B.

The carrier phase control section 62 further includes a selector control section 6D which controls the selector 6C so that it selects, upon leading-in of a signal, normalized signal decision error information from the first signal decision error detection section 6A, but selects, upon ordinary operation after signal leading-in, normalized signal decision error information from the second signal decision error detection section 6B.

Here, since a signal is unstable upon signal leading-in, signal decision error information detected from a signal after error correction has been performed by the soft decision section 64B is not used since it is low in accuracy, but signal decision error information detected from a signal before such error correction is performed is used. In other words, upon signal leading-in, normalized signal decision error information from the first signal decision error detection section 6A is selected under the control of the selector control section 6D, and consequently, the carrier phase control section 62 operates based on the construction shown in FIG. 8 or 10.

On the other hand, upon ordinary operation after signal leading-in, since a signal is stable, normalized signal decision error information from the second signal decision error detection section 6B which is higher in accuracy is selected under the control of the selector control section 6D, and consequently, the carrier phase control section 62 operates based on the construction shown in FIG. 9 or 12.

Referring back to FIG. 7, the carrier phase control section 62 further includes a phase intercept variation removal section 5 which predicts and removes a phase intercept variation of a transmission signal based on normalized signal decision error information selectively outputted from the selector 6C and the output of the frequency offset prediction section 4A. The phase intercept variation removal section 5 includes a phase intercept variation prediction section 5A and an adder 5B.

The phase intercept variation prediction section 5A predicts a phase intercept variation of a transmission signal based on normalized signal decision error information selectively outputted from the selector 6C and the output of the frequency offset prediction section 4A. The phase intercept variation prediction section 5A includes a first predictor 5AA, a second predictor 5AB and an adder 5AC.

The first predictor 5AA includes a correlation calculation section 5AA-1, an updating section 5AA-2 and a multiplication section 5AA-3. The second predictor 5AB includes a correlation calculation section 5AB-1, an updating section 5AB-2 and a multiplication section 5AB-3. As hereinafter described, the first predictor 5AA and the second predictor 5AB are different only in detailed construction of the correlation calculation sections 5AA-1 and 5AB-1 whether the communication apparatus is in a signal leading-in operation mode or in an ordinary operation mode after such signal leading-in.

The correlation calculation section 5AA-1 of the first predictor 5AA upon signal leading-in shown in FIG. 10 calculates a correlation between normalized signal decision error information (ERRH) obtained by the first signal decision error detection section 6A and the output ($e^{jwt}$) of the frequency offset prediction section 4A. The correlation calculation section 5AA-1 includes a multiplier 95A, a rounding processing section 95B and a multiplier 95C.

In particular, the multiplier 95A calculates such a conjugate complex number with the output of the frequency offset prediction section 4A as given by the following equation (4):

$$e^{-jwt} = \overline{(e^{jwt})} \qquad (4)$$

The thus calculated conjugate complex number is rounded by the rounding processing section 95B and is then multiplied by a time constant (APCT) by the multiplier 95C.

The updating section 5AA-2 shown in FIG. 10 or 12 updates the output of the correlation calculation section 5AA-1 and includes a pair of adders 94A and 94B and a delay section 94C. The adders 94A and 94B and the delay section 94C cooperatively update the output of the correlation calculation section 5AA-1 in accordance with the following equation (5):

$$APJ_{n+1} = APJ_n + APCT \cdot e^{-jwt} \cdot E \qquad (5)$$

where APJ and E are the vectors, and E is ERRH or ERRV.

The multiplication section 5AA-3 multiplies the output of the updating section 5AA-2 and the output ($e^{jwt}$) of the frequency offset prediction section 4A.

Further, a result of the multiplication by the multiplication section 5AA-3 is rounded by a rounding processing section 96 and then adjusted in level by a level adjustment section 97.

The second predictor 5AB has a detailed construction similar to that of the first predictor 5AA described hereinabove except that it includes, in addition to components similar to those of the first predictor 5AA described above, a multiplier 98 and a rounding processing section 99 and predicts a phase intercept variation of a transmission signal using a signal obtained by doubling the output of the frequency offset prediction section 4A.

On the other hand, the first predictor 5AA and the second predictor 5AB in ordinary operation after signal leading-in are different from those upon signal leading-in in that, as seen in FIG. 12, each of the correlation calculation sections 5AA-1 and 5AB-1 includes, in addition to the construction upon signal leading-in described above, a delay section 95D having a similar function to that of the delay section 6B-2 of the second signal decision error detection section 6B.

In particular, each of the correlation calculation sections 5AA-1 and 5AB-1 calculates a correlation between signal decision error information (ERRV) obtained by the second signal decision error detection section 6B and a signal obtained by delaying the output ($e^{jwt}$) of the frequency offset prediction section 4A.

It is to be noted that the calculations of the phase intercept variation prediction section 5A described above are simplified since normalized signals from signal decision error information from the first signal decision error detection section 6A and the second signal decision error detection section 6B are used.

The adder 5AC adds the output of the first predictor 5AA and the output of the second predictor 5AB and outputs a predicted value of a phase intercept variation of a high degree of accuracy as an output of the phase intercept variation prediction section 5A.

A multiplication section 105 multiplies a result of the addition from the adder 5AC by a signal obtained by removing an offset of the frequency of a transmission signal to produce a phase intercept variation removal signal corresponding to signal points after removal of an offset. A rounding processing section 106 performs rounding processing of such phase intercept variation removal signal produced by the multiplication section 105.

Further, the adder 5B adds the output of the phase intercept variation prediction section 5A and the output of the multiplier 4B and inputs a signal after a phase intercept variation has been removed to the hard decision section 64A.

Thus, a signal outputted from the automatic equalization section 60 is processed by such signal processing as described below by the carrier phase control section 62 to remove a frequency offset and a phase intercept variation from the signal, and a resulted signal is inputted to the hard decision section 64A.

In particular, the normalization section 7 normalizes an input signal to the hard decision section 64A at a predetermined position on a vector plane based on the input signal to the hard decision section 64A and a false reference signal from the hard decision section 64A.

Meanwhile, the frequency offset removal section 4 predicts and removes an offset of the frequency of a transmission signal based on the output of the normalization section 7. In particular, the frequency offset prediction section 4A predicts a frequency offset of the transmission signal based on the output of the normalization section 7, and the multiplier 4B multiplies the output of the frequency offset prediction section 4A and the output of the automatic equalization section 60 to remove the frequency offset of the transmission signal.

Further, the first signal decision error detection section 6A detects a signal decision error normalized at a predetermined position on the vector plane from input and output information to and from the hard decision section 64A, and the second signal decision error detection section 6B detects a signal decision error normalized at a predetermined position on the vector plane from the input information to the hard decision section 64A and output information from the soft decision section 64B. The selector 6C selects, under the control of the selector control section 6D, the normalized signal decision error information from the first signal decision error detection section 6A upon signal leading-in, but selects, in ordinary operation after such signal leading-in, the normalized signal decision error information from the second signal decision error detection section 6B.

The phase intercept variation removal section 5 predicts and removes a phase intercept variation of the transmission signal based on the normalized signal decision error information selectively outputted from the selector 6C and the output of the frequency offset prediction section 4A.

In particular, the phase intercept variation prediction section 5A of the phase intercept variation removal section 5 predicts a phase intercept variation of the transmission signal based on the normalized signal decision error information selectively outputted from the selector 6C and the output of the frequency offset prediction section 4A, and the adder 5B adds the output of the phase intercept variation prediction section 5A and the output of the multiplier 4B and inputs a signal, from which the phase interception variation has been removed, to the hard decision section 64A.

Accordingly, a phase intercept variation which has made a factor of signal deterioration as indicated by the signal points A1 and A2 described hereinabove with reference to FIG. 15 can be removed as seen from signal points A1' and A2' shown in FIG. 14.

In the modem in which the carrier phase correction section 62 described above is incorporated, communication of data is performed in the following manner.

In particular, in the transmission section 20, main channel data SDm are converted from serial data into parallel data by the serial to parallel converter 30, and the parallel data are scrambled by the scrambler 32A. Then, a sum calculation of the output of the scrambler 32A is performed by the sum calculation section 34A to produce relative difference data, and the relative difference data are processed so as to correct errors by the trellis-coded modulation section 36. Then, desired signal points are generated based on the output of the trellis-coded modulation section 36 by the signal point generation section 38A.

Meanwhile, also secondary data SDs are scrambled by the scrambler 32B, and a sum calculation of the output of the scrambler 32B is performed by the sum calculation section 34B to produce relative difference data. Then, desired signal points are generated based on the relative difference data by the signal point generation section 38A.

Thereafter, the two signals generated as described above are supplied by way of the frame rotation section 40 to the roll-off filter 42, by which filtering processing thereof is performed. A resulted signal from the roll-off filter 42 is modulated by the modulation section 44. Further, the modulated signal is equalized in terms of a delay, an amplitude component on a line and so forth by the fixed equalization section 46 and is then adjusted in level by the attenuator 48, whereafter it is converted from a digital signal into an analog signal by the digital to analog converter 28. The analog signal thus obtained is transmitted in accordance with a non-Nyquist transmission system by way of the line.

In the reception section 22, the received signal is converted from an analog signal into a digital signal by the analog to digital converter 29. The digital signal from the analog to digital converter 29 is equalized in terms of a delay, an amplitude component on a line and so forth by the fixed equalizer 52 and then demodulated by the demodulation section 54. The thus demodulated signal is filtered by the roll-off filter 56, and then, the loop gain thereof is adjusted by the automatic gain control section 58 so that the level of the demodulated signal may have a predetermined reference value to automatically adjust a reception level of a signal to be inputted to the automatic equalization section 60 at the following stage.

Then, equalization processing to correct a transmission distortion by the line and so forth is performed by the automatic equalization section 60, and then a frequency offset or a phase intercept variation is forecast and removed to correct a carrier phase by the carrier phase correction section 62 as described above, whereafter pre-signal discrimination is performed by the hard decision section 64A and then by the soft decision section 64B. Thereafter, the signal points of the main data are discriminated by the signal point discrimination section 68A while the signal points of the secondary data are discriminated by the signal point discrimination section 68B.

Thereafter, the main data and the secondary data are separately processed by difference calculation processing and descrambling processing.

Consequently, stabilized very high rate data transmission can be realized without using a data compression function, and the modem is provided with an improved reliability.

In this manner, with the carrier phase control circuit of the embodiment of the present invention described above, since a phase intercept variation can be removed from a transmission signal, if the carrier phase control circuit is applied to such a very high speed modem that has a communication speed of 28.8 kbps, occurrence of a communication error can be suppressed. Consequently, there is an advantage in that the characteristic of the very high speed modem can be improved remarkably, and this contributes very much to putting of the modem into practical use.

Further, since a phase intercept variation is predicted by adding a phase intercept variation predicted by the first predictor 5AA and another phase intercept variation predicted by the second predictor 5AB based on signal decision error information and a signal obtained by multiplying the output of the frequency offset prediction section 4A by an integral number, a phase intercept variation of a higher degree of accuracy can be predicted. Consequently, there is another advantage in that removal of a phase intercept variation can be performed with a high degree of accuracy by the phase intercept variation removal section 5.

Furthermore, since an offset of a frequency is predicted and removed based on a signal normalized at a predetermined position on a vector plane, there is a further advantage in that a phase intercept variation can be removed similarly as described above and calculation for prediction of a frequency offset can be performed in a simplified manner.

Besides, since a phase intercept variation is predicted by adding a phase intercept variation predicted by the first predictor 5AA and another phase intercept variation predicted by the second predictor 5AB based on signal decision error information and a signal obtained by multiplying the output of the frequency offset prediction section 4A by an integral number and besides a frequency offset is predicted and removed based on a signal normalized at a predetermined position on a vector plane, there is a further advantage in that a phase intercept variation can be removed with a higher degree of accuracy similarly as described above and calculation for prediction of a frequency offset can be performed in a simplified manner. Consequently, there is another advantage in that, if the carrier phase control circuit is applied to a very high speed modem having such a very high communication speed of, for example, 28.8 kbps, then occurrence of a communication error can be suppressed with a high degree of accuracy based on simplified calculation processing.

Further, since the selector control section 6D controls the selector 6C so that it selects, upon signal leading-in, normalized signal decision error information from the first signal decision error detection section 6A but selects, in ordinary operation after such signal leading-in, normalized signal decision error information from the second signal decision error detection section 6B, calculation for prediction of a phase intercept variation can be performed efficiently with a high degree of accuracy in response to a condition of a signal.

(c) Others

While, in the embodiment described, a phase intercept variation is removed in different manners of detection of a signal decision error whether the communication apparatus is in a signal leading-in operation mode or in an ordinary operation mode after such signal leading-in, the present invention is not limited to the specific embodiment in this regard. In particular, removal of a phase intercept variation which is a unique advantage achieved by the present invention can be performed even where the present invention is applied to such a carrier phase control circuit as shown in FIG. 1 which merely includes a frequency offset removal section 4 for predicting and removing an offset of the frequency of a transmission signal based on the output of an automatic equalizer 2, and a phase intercept variation removal section 5 for predicting and removing a phase intercept variation of the transmission signal based on the output of the frequency offset removal section 4 and inputting a resulted signal as an output thereof to a signal decision section 3.

Further, in addition to the manner of removal of a phase intercept variation in the embodiment described hereinabove, removal of a phase intercept variation which is a unique advantage achieved by the present invention can be performed even where the present invention is applied to such a carrier phase control circuit as shown in FIG. 2 which merely includes a frequency offset removal section 4 including a frequency offset prediction section 4A for predicting an offset of the frequency of a transmission signal based on the output of an automatic equalizer 2 and a multiplier 4B for multiplying the output of the frequency offset prediction section 4A and the output of the automatic equalizer 2, a signal decision error detection section 6 for detecting a signal decision error from input and output information to and from a signal decision section 3, and an phase intercept variation removal section 5 including a phase intercept variation prediction section 5A for predicting a phase intercept variation of the transmission signal based on information of the signal decision error obtained by the signal decision error detection section 6 and the output of the frequency offset prediction section 4A of the frequency offset removal section 4, and an adder 5B for adding the output of the phase intercept variation prediction section 5A and the output of the multiplier 4B and inputting a resulted signal to the signal decision section 3.

The phase intercept variation prediction section 5A may include a correlation calculation section for calculating a correlation between signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A.

Or, the phase intercept variation prediction section 5A may include a first predictor for predicting a phase intercept variation of a transmission signal based on signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

In this instance, the first predictor may include a correlation calculation section for calculating a correlation between the signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A, and the second predictor may include a correlation calculation section for calculating a correlation between the signal decision error information obtained by the signal decision error detection section 6 and the output of the frequency offset prediction section 4A, an updating section for updating the output of the correlation calculation section, and a multiplication section for multiplying the output of the updating section and the output of the frequency offset prediction section 4A.

The signal decision section 3 may include a hard decision section for outputting a false reference signal corresponding to an input signal thereto, and the signal decision error detection section 6 may detect a signal decision error from input and output information to and from the hard decision section. In this instance, the phase intercept variation prediction section 5A may include a first predictor for predicting a phase intercept variation of a transmission signal based on signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

Alternatively, the signal decision section 3 may include a hard decision section for outputting a false reference signal corresponding to an input signal thereto, and a soft decision section for receiving the false reference signal and a hard decision input signal from the hard decision section to perform error correction, and the signal decision error detection section 6 may detect a signal decision error from input information to the hard decision section and output information of the soft decision section. In this instance, the phase intercept variation prediction section 5A may include a first predictor for predicting a phase intercept variation of the transmission signal based on the signal decision error information obtained by the signal decision error detection section 6 and the output of the frequency offset prediction section 4A, a second predictor for predicting the phase intercept variation of the transmission signal based on the signal decision error information obtained by the signal decision error detection section 6 and a signal obtained by multiplying the output of the frequency offset prediction section 4A by an integral number, and an adder for adding the output of the first predictor and the output of the second predictor.

Or, the signal decision section 3 may include a hard decision section for outputting a false reference signal corresponding to an input signal thereto, and the signal decision error detection section 6 may detect a signal decision error normalized at a predetermined position on a vector plane from input and output information to and from the hard decision section. In this instance, the phase intercept variation prediction section 5A may include a first predictor for predicting a phase intercept variation of the transmission signal based on the normalized signal decision error information obtained by the signal decision error detection section 6 and the output of the frequency offset prediction section 4A, a second predictor for predicting the phase intercept variation of the transmission signal based on the normalized signal decision error information obtained by the signal decision error detection section 6 and a signal obtained by multiplying the output of the frequency offset prediction section 4A by an integral number, and an adder for adding the output of the first predictor and the output of the second predictor.

Otherwise, the signal decision section 3 may include a hard decision section for outputting a false reference signal corresponding to an input signal thereto, and a soft decision section for receiving the false reference signal and a hard decision input signal from the hard decision section to perform error correction, and the signal decision error detection section 6 may detect a signal decision error normalized at a predetermined position on a vector plane from input information to the hard decision section and output information of the soft decision section. In this instance, the phase intercept variation prediction section 5A may include a first predictor for predicting a phase intercept variation of the transmission signal based on the normalized signal decision error information obtained by the signal decision error detection section 6 and the output of the frequency offset prediction section 4A, a second predictor for predicting the phase intercept variation of the transmission signal based on the normalized signal decision error information obtained by the signal decision error detection section 6 and a signal obtained by multiplying the output of the frequency offset prediction section 4A by an integral number, and an adder for adding the output of the first predictor and the output of the second predictor.

Or else, the signal decision section 3 may include a hard decision section for outputting a false reference signal corresponding to a signal from the adder 5B which adds the output of the multiplier 4B and the output of the phase intercept variation prediction section 5A and inputs a result of the addition to the signal decision section 3, and the carrier phase control circuit may further comprise a normalization section for normalizing an input signal to the hard decision section at a predetermined position on a vector plane based on the input signal to the hard decision section and a false reference signal from the hard decision section, the frequency offset removal section 4 predicting and removing an offset of the frequency of the transmission signal based on the output of the normalization section.

It is to be noted that the application of the present invention is not limited to a modem, and the present invention can be applied similarly to other various communication apparatus.

Further, while, in the embodiment described above, the present invention is applied to a reception section of a modem for communication of data in accordance with a non-Nyquist transmission system, the application of the present invention is not limited to reception sections of modems of the specific type, and similar advantages to those of the embodiment described above can be achieved also where the present invention is applied to communication apparatus by which data are communicated in accordance with the Nyquist transmission system.

The present invention is not limited to the specifically described embodiment, and variations and modifications may be made without departing from the scope of the present invention.

What is claimed is:

1. A carrier phase control circuit provided on a reception side of a communication apparatus and interposed between an automatic equalizer and a signal decision section, comprising:

a frequency offset removal section for predicting and removing an offset of a frequency of a transmission signal based on an output of said automatic equalizer; and a phase intercept variation removal section for predicting and removing a phase intercept variation of the transmission signal based on an output of said frequency offset removal section and inputting a resulted signal as an output thereof to said signal decision section.

2. A carrier phase control circuit provided on a reception side of a communication apparatus and interposed between an automatic equalizer and a signal decision section, comprising:

a frequency offset removal section including a frequency offset prediction section for predicting an offset of a frequency of a transmission signal based on an output of said automatic equalizer and a multiplier for multiplying an output of said frequency offset prediction section and the output of said automatic equalizer;

a signal decision error detection section for detecting a signal decision error from input and output information to and from said signal decision section; and a phase intercept variation removal section including a phase intercept variation prediction section for predicting a phase intercept variation of the transmission signal based on information of the signal decision error obtained by said signal decision error detection section and an output of said frequency offset prediction section of said frequency offset removal section, and an adder for adding an output of said phase intercept variation prediction section and an output of said multiplier and inputting a resulted signal to said signal decision section.

3. The carrier phase control circuit as claimed in claim 2, wherein said phase intercept variation prediction section includes a correlation calculation section for calculating a correlation between signal decision error information obtained by said signal decision error detection section and the output of said frequency offset prediction section, an updating section for updating an output of said correlation calculation section, and a multiplication section for multiplying an output of said updating section and the output of said frequency offset prediction section.

4. The carrier phase control circuit as claimed in claim 2, wherein said phase intercept variation prediction section includes a first predictor for predicting the phase intercept variation of the transmission signal based on signal decision error information obtained by said signal decision error detection section and the output of said frequency offset prediction section, a second predictor for predicting the phase intercept variation of the transmission signal based on the signal decision error information obtained by said signal decision error detection section and a signal obtained by multiplying the output of said frequency offset prediction section by an integral number, and an adder for adding an output of said first predictor and an output of said second predictor.

5. The carrier phase control circuit as claimed in claim 4, wherein said first predictor includes a correlation calculation section for calculating a correlation between the signal decision error information obtained by said signal decision error detection section and the output of said frequency offset prediction section, an updating section for updating an output of said correlation calculation section, and a multiplication section for multiplying an output of said updating section and the output of said frequency offset prediction section, and said second predictor includes a correlation calculation section for calculating a correlation between the signal decision error information obtained by said signal decision error detection section and the output of said frequency offset prediction section, an updating section for updating an output of said correlation calculation section, and a multiplication section for multiplying an output of said updating section and the output of said frequency offset prediction section.

6. The carrier phase control circuit as claimed in claim 2, wherein said signal decision section includes a hard decision section for outputting a false reference signal corresponding to an input signal thereto, and said signal decision error detection section detects the signal decision error from input and output information to and from said hard decision section.

7. The carrier phase control circuit as claimed in claim 2, wherein said signal decision section includes a hard decision section for outputting a false reference signal corresponding to an input signal thereto while said signal decision error detection section detects a signal decision error from input and output information to and from said hard decision section, and said phase intercept variation prediction section includes a first predictor for predicting the phase intercept variation of the transmission signal based on signal decision error information obtained by said signal decision error detection section and the output of said frequency offset prediction section, a second predictor for predicting the phase intercept variation of the transmission signal based on the signal decision error information obtained by said signal decision error detection section and a signal obtained by multiplying the output of said frequency offset prediction section by an integral number, and an adder for adding an output of said first predictor and an output of said second predictor.

8. The carrier phase control circuit as claimed in claim 2, wherein said signal decision section includes a hard decision section for outputting a false reference signal corresponding to an input signal thereto, and a soft decision section for receiving the false reference signal and a hard decision input signal from said hard decision section to perform error correction, and said signal decision error detection section detects the signal decision error from input information to said hard decision section and output information of said soft decision section.

9. The carrier phase control circuit as claimed in claim 2, wherein said signal decision section includes a hard decision section for outputting a false reference signal corresponding to an input signal thereto, and a soft decision section for receiving the false reference signal and a hard decision input signal from said hard decision section to perform error correction, and said signal decision error detection section detects the signal decision error from input information to said hard decision section and output information of said soft decision section, said phase intercept variation prediction section including a first predictor for predicting the phase intercept variation of the transmission signal based on signal decision error information obtained by said signal decision error detection section and the output of said frequency offset prediction section, a second predictor for predicting the phase intercept variation of the transmission signal based on the signal decision error information obtained by said signal decision error detection section and a signal obtained by multiplying the output of said frequency offset prediction section by an integral number, and an adder for adding an output of said first predictor and an output of said second predictor.

10. The carrier phase control circuit as claimed in claim 2, wherein said signal decision section includes a hard decision section for outputting a false reference signal corresponding to an input signal thereto, and said signal decision error detection section detects the signal decision error normalized at a predetermined position on a vector plane from input and output information to and from said hard decision section.

11. The carrier phase control circuit as claimed in claim 2, wherein said signal decision section includes a hard decision section for outputting a false reference signal corresponding to an input signal thereto, and said signal decision error detection section detects said signal decision error, said signal decision error being normalized into normalized signal decision error information at a predetermined position on a vector plane from input and output information to and from said hard decision section, said phase intercept variation prediction section including a first predictor for predicting the phase intercept variation of the transmission signal based on the normalized signal decision error information obtained by said signal decision error detection section and the output of said frequency offset prediction section, a second predictor for predicting the phase intercept variation of the transmission signal based on the normalized signal decision error information obtained by said signal decision error detection section and a signal obtained by multiplying the output of said frequency offset prediction section by an integral number, and an adder for adding an output of said first predictor and an output of said second predictor.

12. The carrier phase control circuit as claimed in claim 2, wherein said signal decision section includes a hard decision section for outputting a false reference signal corresponding to an input signal thereto, and a soft decision section for receiving the false reference signal and a hard decision input signal from said hard decision section to perform error correction, and said signal decision error detection section detects said signal decision error normalized at a predetermined position on a vector plane from input information to said hard decision section and output information of said soft decision section.

13. The carrier phase control circuit as claimed in claim 2, wherein said signal decision section includes a hard decision section for outputting a false reference signal corresponding to an input signal thereto, and a soft decision section for receiving the false reference signal and a hard decision input signal from said hard decision section to perform error correction, and said signal decision error detection section detects said signal decision error, said signal decision error being normalized into normalized signal decision error information at a predetermined position on a vector plane from input information to said hard decision section and output information of said soft decision section, said phase intercept variation prediction section including a first predictor for predicting the phase intercept variation of the transmission signal based on the normalized signal decision error information obtained by said signal decision error detection section and the output of said frequency offset prediction section, a second predictor for predicting the phase intercept variation of the transmission signal based on the normalized signal decision error information obtained by said signal decision error detection section and a signal obtained by multiplying the output of said frequency offset prediction section by an integral number, and an adder for adding an output of said first predictor and an output of said second predictor.

14. The carrier phase control circuit as claimed in claim 2, wherein said signal decision section includes a hard decision section for outputting a false reference signal corresponding to a signal from said adder which adds the output of said multiplier and the output of said phase intercept variation prediction section and inputs a result of the addition to said signal decision section, and said carrier phase control circuit further comprises a normalization section for normalizing an input signal to said hard decision section at a predetermined position on a vector plane based on the input signal to said hard decision section and a false reference signal from said hard decision section, said frequency offset removal section predicting and removing an offset of a frequency of the transmission signal based on an output of said normalization section.

15. The carrier phase control circuit provided on a reception side of a communication apparatus and interposed between an automatic equalizer and a signal decision section which includes a hard decision section for outputting a false reference signal corresponding to an input signal thereto and a soft decision section for receiving the false reference signal and a hard decision input signal from said hard decision section to perform error correction, comprising:

- a normalization section for normalizing the input signal to said hard decision section at a predetermined position on a vector plane based on the input signal to said hard decision section and the false reference signal from said hard decision section;

- a frequency offset removal section including a frequency offset prediction section for predicting an offset of a frequency of a transmission signal based on an output of said normalization section and a multiplier for multiplying an output of said frequency offset prediction section and an output of said automatic equalizer to remove the offset of the frequency of the transmission signal;

- a first signal decision error detection section for detecting a signal decision error, said signal decision error being normalized into normalized signal decision error information at a predetermined position of the vector plane from input and output information to and from said hard decision section;

- a second signal decision error detection section for detecting a signal decision error, said signal decision error being normalized into normalized signal decision error information at a predetermined position on the vector plane from the input information to said hard decision section and output information from said soft decision section;

- a selector for selectively outputting information of the normalized signal decision error from said first signal decision error detection section or said second signal decision error detection section;

- a phase intercept variation removal section including a phase intercept variation prediction section for predicting a phase intercept variation of the transmission signal based on the normalized signal decision error information selectively outputted from said selector and an output of said frequency offset prediction section, and an adder for adding an output of said phase intercept variation prediction section and an output of said multiplier to remove the phase intercept variation from the transmission signal and inputting a resulted signal to said hard decision section; and

- a selector control section for controlling said selector to select, upon leading-in of a signal, the normalized signal decision error information from said first signal decision error detection section but select, in ordinary operation after such signal leading-in, the normalized signal decision error information from said second signal decision error detection section.

* * * * *